United States Patent
Kondo et al.

(10) Patent No.: US 6,290,009 B1
(45) Date of Patent: Sep. 18, 2001

(54) SWIVEL WORKING VEHICLE

(75) Inventors: Masami Kondo; Takuzo Kawamura; Hajime Setoguchi; Katashi Tanaka, all of Osaka (JP)

(73) Assignee: Yanmar Diesel Engine Co., Ltd., Osaka (JP)

( * ) Notice: Subject to any disclaimer, the term of this patent is extended or adjusted under 35 U.S.C. 154(b) by 0 days.

(21) Appl. No.: 09/242,559

(22) PCT Filed: Aug. 20, 1997

(86) PCT No.: PCT/JP97/02899

§ 371 Date: Feb. 19, 1999

§ 102(e) Date: Feb. 19, 1999

(87) PCT Pub. No.: WO98/07613

PCT Pub. Date: Feb. 26, 1998

(30) Foreign Application Priority Data

| Aug. 20, 1996 | (JP) | 8-218657 |
| Jul. 1, 1997 | (JP) | 9-176037 |
| Jul. 1, 1997 | (JP) | 9-176038 |

(51) Int. Cl.$^7$ ................................................ B62D 55/14
(52) U.S. Cl. ..................... 180/9.1; 180/89.1; 305/171; 37/410; 37/466; 212/195; 414/719; 414/687
(58) Field of Search ..................... 305/171, 172, 305/173, 174, 177; 180/6.64, 6.7, 9.1, 89.1, 89.13; 280/760; 37/410, 443, 466, 379; 212/195, 253; 414/719, 694, 687

(56) References Cited

U.S. PATENT DOCUMENTS

| 3,851,776 | * | 12/1974 | Leyrat | 214/142 |
| 3,851,931 | * | 12/1974 | Crisafulli | 305/54 |
| 4,433,634 | * | 2/1984 | Coast | 114/270 |
| 4,647,116 | * | 3/1987 | Trask | 305/27 |
| 4,904,030 | * | 2/1990 | Ono | 305/35 EB |
| 5,131,728 | * | 7/1992 | Katoh et al. | 305/35 EB |
| 5,295,741 | * | 3/1994 | Togashi et al. | 305/38 |
| 5,362,142 | * | 11/1994 | Katoh | 305/38 |
| 5,368,376 | * | 11/1994 | Edwards et al. | 305/35 EB |
| 5,380,076 | * | 1/1995 | Hori | 305/38 |
| 5,447,365 | * | 9/1995 | Muramatsu et al. | 305/38 |
| 5,593,218 | * | 1/1997 | Katoh et al. | 305/174 |
| 5,671,820 | * | 9/1997 | Kobayashi et al. | 180/68.1 |
| 5,913,374 | * | 6/1999 | Becker et al. | 180/9.1 |
| 5,984,437 | * | 11/1999 | Katoh | 305/159 |
| 6,170,588 | * | 1/2001 | Irino et al. | 180/89.1 |

FOREIGN PATENT DOCUMENTS

| 56-129378 | 10/1981 | (JP) . |
| 58-36973 | 3/1983 | (JP) . |
| 59-8873 | 1/1984 | (JP) . |
| 61-147679 | 9/1986 | (JP) . |
| 06-234376 | 8/1994 | (JP) . |
| 06-286674 | 10/1994 | (JP) . |
| 08-26154 | 1/1996 | (JP) . |
| 08-164881 | 6/1996 | (JP) . |
| 8-150969 | 6/1996 | (JP) . |
| 08-188184 | 7/1996 | (JP) . |
| 08-301154 | 11/1996 | (JP) . |
| 9-95978 | * | 4/1997 | (JP) . |
| 10-140613 | * | 5/1998 | (JP) . |
| 10 204910 | * | 8/1998 | (JP) . |

* cited by examiner

Primary Examiner—Brian L. Johnson
Assistant Examiner—Daniel Yeagley
(74) Attorney, Agent, or Firm—Sterne, Kessler, Goldstein & Fox P.L.L.C.

(57) ABSTRACT

When a conventional swivel working vehicle is constructed such that a real part of a swivel body is not extended beyond a traveling device in order to improve an operability at a small site, a balance weight must he significantly increased in weight so as to prevent falling and tumbling of a machine body. In the invention, left and right core metal projections of a crawler are laterally offset from a center line of the crawler and right and left lugs are formed on an outer peripheral surface of the crawler. The lugs are formed to assume the same shape on the right and left sides or laterally symmetrical shapes or occupy the same area on the right and left sides, and to be symmetrically shaped about a center of rotation of the swivel body between the left and right crawlers of the machine body.

8 Claims, 33 Drawing Sheets number of left steel cords = number of right steel cords

SWIVEL WORKING VEHICLE

BACKGROUND OF THE INVENTION

1. Field of the Invention

The present invention relates to a construction of traveling devices of a swivel working vehicle like a crawler hydraulic shovel.

2. Related Art

Conventional arts about a form of a crawler for a crawler traveling device have been shown in Japanese Laid Open Gazettes Nos. Hei 8-53079, Hei 8-58647, 72759, Hei 8-85480, Hei 8-85482, Hei 8-91256, Hei 8-99656 and Hei 8-104262, for example.

A conventional crawler hydraulic shovel that is utilized as a swivel working vehicle is shown in FIG. 5. A swivel body F' is provided with a back-hoe including a bucket 4 and is mounted above left and right traveling devices K'. A rear end of swivel body F', when swivelled so as to be directed substantially perpendicular to the traveling direction of the traveling devices K', projects outwardly beyond the respective outer edge of the traveling device K'.

When the conventional swivel vehicle is carried by a small dump truck T, i.e., one of 2 or 4 capacity tonnage which can be driven by a common licensed driver to an excavating site, it is placed on a bed 2 of the dump truck T, as shown in FIG. 5, so that the swivel body F' is swivelled so as to direct the bucket 4 substantially perpendicularly to the traveling direction of the machine body. In this condition, a balance weight W1 on the rear end of the swivel body F' projects outwardly from one of the traveling devices K'.

As shown in FIG. 5, the swivel body F' is loaded with the balance weight W1 so that with respect to core metal projections 1a' of one of crawlers 1' a balanced point P' is defined. Thus, a part of the swivel body F' toward the balance weight W1 is balanced against the other part thereof toward the bucket 4 along balanced point P'.

In this construction, a distance b1 between the balanced point P' and the center of gravity of the balance weight W1 is set longer than a distance a1 between the balanced point P' and the center of gravity of the bucket 4, so that the weight balance between the part toward the bucket 4 and the part toward the balance weight W1 is maintained with the balance weight W1 being relatively light. The relationship between distances a1 and b1, and balance weight W1 and the weight of the swivel working machine toward the bucket, stabilizes the vehicle when it operates in the condition that the swivel body F' is swivelled so as to direct the back-hoe including the bucket 4 substantially perpendicular to the traveling direction of the traveling devices K', while the width between the traveling devices K' is small enough to fit on the bed 2 of the dump truck T.

On the other hand, a swivel working vehicle as shown in FIG. 3 has a small swivelling capacity and is constructed such that a rear portion of a swivel body F is formed into a circular shape and is disposed within a lateral width that extends between the outer edges of the traveling devices K. In this construction, the rear portion of the swivel body F does not project beyond the traveling devices K. However, when the swivel body F is swivelled so as to direct the back-hoe thereon including a bucket 4 substantially perpendicular to the traveling direction of the traveling devices K, it may become unbalanced due to the heavy weight of the bucket 4 and a bucket arm 5 against the balance weight W2. If the swivel body F becomes unbalanced, the machine body is apt to tilt toward the bucket 4, thereby causing the vehicle in operation to tumble or the vehicle placed on the bed 2 of the dump truck T to fall. Thus, the swivel working vehicle shown in FIG. 3 requires the balance weight W2 thereof to be considerably heavier than the balance weight W1 of the swivel body F' in FIG. 5 to prevent it from tumbling toward the bucket 4.

The conventional small swivel working vehicle shown in FIG. 3 that is provided with the balance weight W2, which is heavier than the balance weight W1, swivels and operates more advantageously in comparison with the vehicle shown in FIG. 5. However, it may not operate as well as an excavation working vehicle and is more expensive due to the weight of its balance weight W2.

DISCLOSURE OF THE INVENTION

According to the present invention, a swivel working vehicle with a small circular swivelling capacity as shown in FIG. 3 is designed to prevent it from tumbling toward a bucket 4 when the back-hoe including the bucket 4 is swivelled so as to be directed substantially perpendicular to the traveling direction of the traveling devices K'. The swivel working vehicle of the present invention includes a lighter balance weight W2 and core metal projections 1a of a crawler 1 that define a point P that is the point at which the side toward the bucket 4 of the working mechanism and the side toward the balance weight W2 are balanced. The core metal projections 1a are offset toward a lateral edge, i.e., the furthermost outer edge of the crawler with respect to a center of rotation of the swivel body, of crawler 1 as much as possible, thereby reducing a distance a2 between the core metal projections 1a and the center of gravity of the bucket 4 and increasing a distance b2 between the core metal projections 1a and the center of gravity of the balance weight W2.

Also, in the present invention, the lugs are formed on the outer peripheral surface of the crawler 1 into such shapes as to prevent eccentric abrasion of the lugs, to make the left and right crawlers replaceable with each other and to ease sweeping of contaminating soils between the lugs while the core metal projections 1a are formed outwardly eccentrically on the crawler 1.

BRIEF DESCRIPTION OF THE DRAWINGS

FIG. 8 is a fragmentary front view of a crawler 1 provided with lugs 1b occupying the same area on the left and right of the core metal projections 1a;

FIG. 9 includes fragmentary sectional front views showing various portions of the crawler 1 provided with the offset core metal projections 1a;

FIG. 13 includes fragmentary sectional front views showing various portions of an iron crawler 11 provided with offset engaging projections 11a;

BEST MODE FOR CARRYING OUT THE INVENTION

Figure 1:
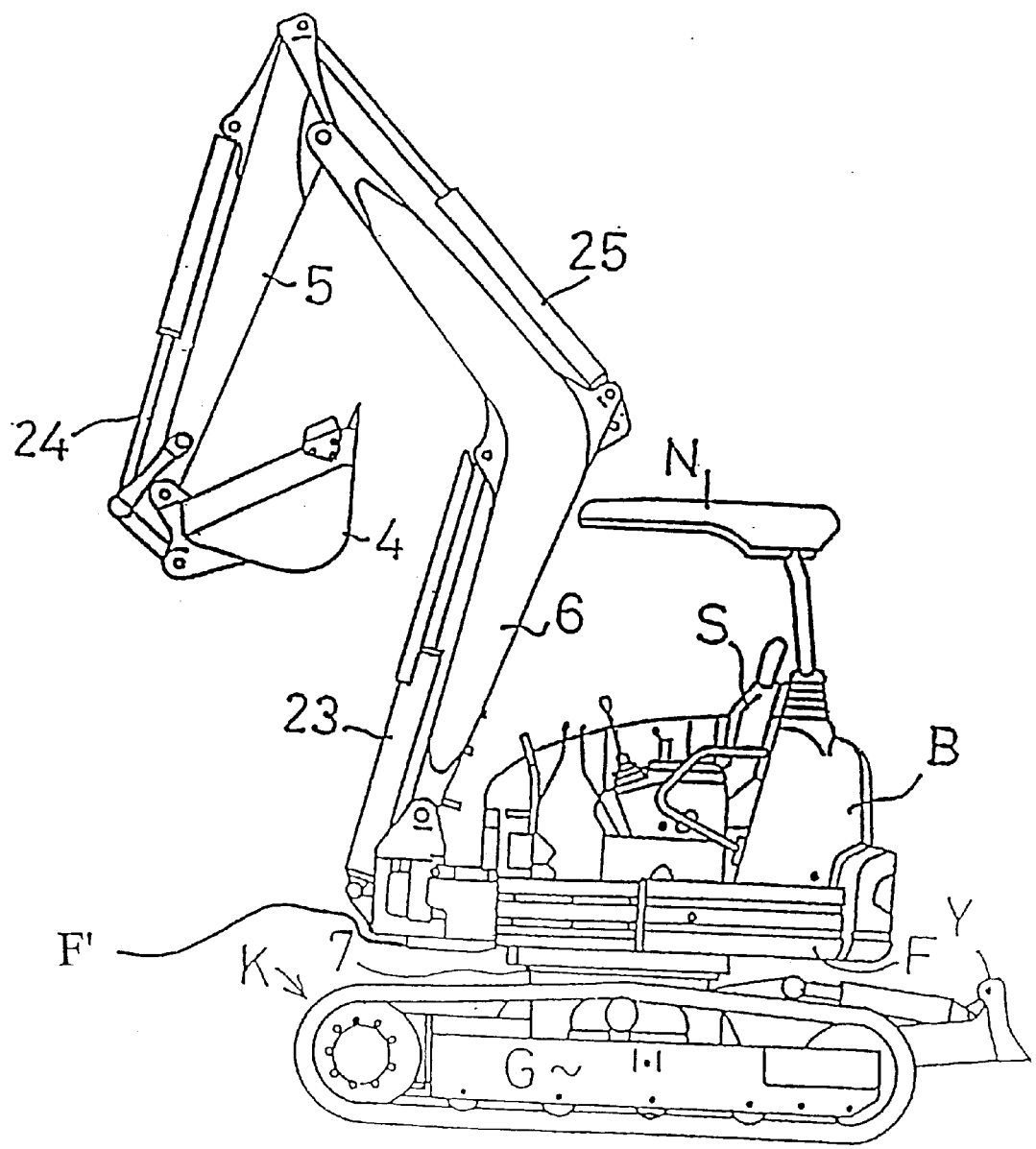
FIG. 1 is a side view of the whole of a swivel working vehicle according to the present invention.

At first, explanation will be given on an entire construction of a swivel working vehicle of the present invention in accordance with FIGS. 1 and 2. Left and right crawler traveling devices K are supported by a roller frame G. The swivel body F is laterally rotatably supported through a swivel 7 disposed on the center of the roller frame G. A blade Y is vertically movably supported on one of front and rear ends of the roller frame G between left and right traveling devices K.

On the swivel body F is disposed an operator's seat S and a bonnet B covering an engine, which are covered thereabove with a canopy N. A basic portion of a main boom 6 is vertically and laterally rotatably supported by the pivot portion F' of the swivel body F. A bucket arm 5 is pivoted onto the utmost end portion of the main boom 6 and the bucket 4 is pivoted onto the utmost end portion of the bucket arm 5. The main boom 6 is rotationally operable by a main boom cylinder 23, the bucket arm 5 is rotationally operable by a bucket arm cylinder 25 and the bucket 4 is rotationally operable by a bucket cylinder 24.

The swivel working vehicle according to the present invention is made to be compact so that it may be used in excavation in a narrow alley. The working vehicle is provided at the lower portion thereof with the traveling devices K and at the upper portion thereof with the swivel body F which has a vertically and laterally rotatable back-hoe attached as a working mechanism thereto.

The rear portion of the swivel body F is formed into a substantially circular shape having a rotational center O of the swivel 7, so that the portion of the swivel body F to the rear of the rotational center O is positioned within the width between the lateral edges, i.e., the furthermost outer edges of the traveling devices with respect to the rotational center O of swivel body F, of the left and right traveling devices K. Accordingly, even when the swivel body F is fully swivelled, the rear portion of the swivel body F does not project beyond the width between the lateral edges of the left and right traveling devices K, thereby preventing the collision with an obstacle surrounding the swivel working vehicle. This construction of the small swivel working vehicle is similarly effective when utilized by a standard sized machine or an extremely small swivel vehicle.

In addition, the front portion of the swivel body F may be formed into a substantially circular shape so as not to project beyond the width between the lateral edges of the left and right traveling devices K, thereby making the entire machine body safer from collision with an obstacle. However, if an extremely small swivel working vehicle, i.e., one which can swivel in an extremely small circle, employs such a construction, the pivotal basic portion of its main boom 6 must be disposed near the rotational center O of its swivel body F. For making its bucket 4 laterally rotatable in this condition, another swing arm must be interposed between its bucket arm 5 and its main boom 6, thereby increasing the weight of its back-hoe serving as the working mechanism thereof so as to be out of balance in weight.

For this reason, only the rear portion of the swivel body F of the small swivel working vehicle according to the present invention is formed into the substantially circular shape centered about the rotational center O. Thus, the basic portion of the main boom 6 disposed at the pivot portion F' of the swivel body projects partly beyond both outer edges of traveling devices K. However, an operator watches forward to prevent the collision of the front portion of the swivel body F with an obstacle.

Figure 10:
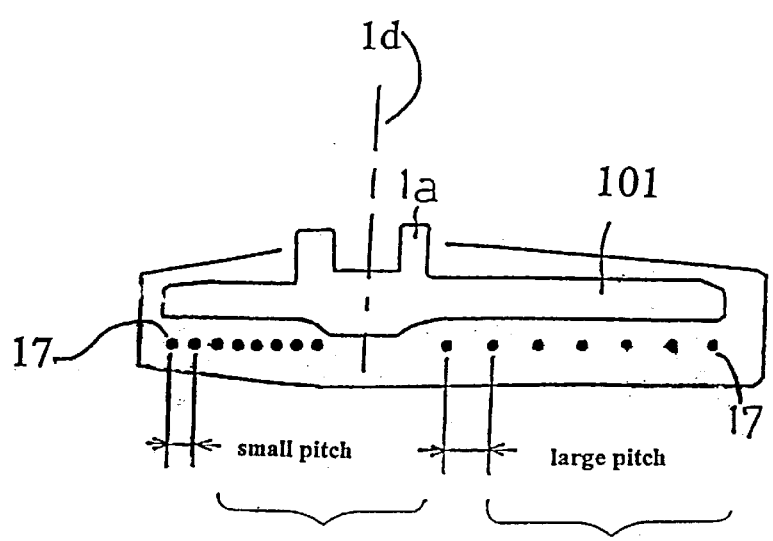
FIG. 10 is a sectional front view of the crawler 1 provided therein with steel cords 17 disposed left and right about the core metal projections 1a for reinforcement so that the left ones are as many as the right ones.

As shown in FIG. 10, each pair of left and right core metal projections 1a may be provided on a common core metal member 101 wrapped in the rubber crawler 1, or alternatively, may be provided on respective left and right separated core metal members. Furthermore, they may be formed of an iron crawler 11 as discussed according to FIG. 13. The left and right core metal projections 1a are constructed to be sandwiched by a plurality of rollers 10 of each traveling device K.

As shown in FIGS. 3–10, a line 1d designates a lateral middle line between the alignment of left core metal projections 1a and the right core metal projections 1a of each crawler 1. Unless the working vehicle tilts or falls, the weight of the working vehicle is applied onto the plurality of rollers 10 of left and right traveling devices K and is balanced between the lateral middle lines 1d, as shown on the left and right crawlers 1, in contact with the ground surface.

Figure 2:
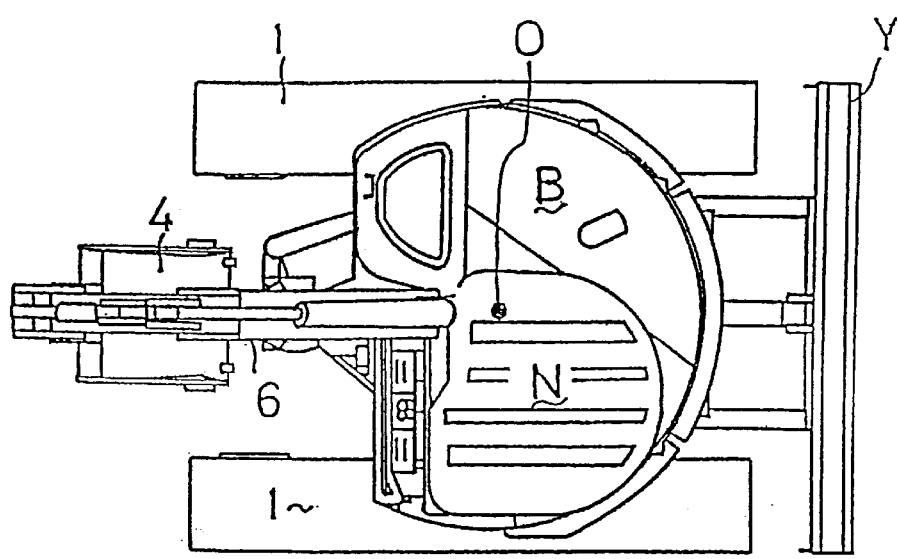
FIG. 2 is a plan view of the same.
Figure 3:
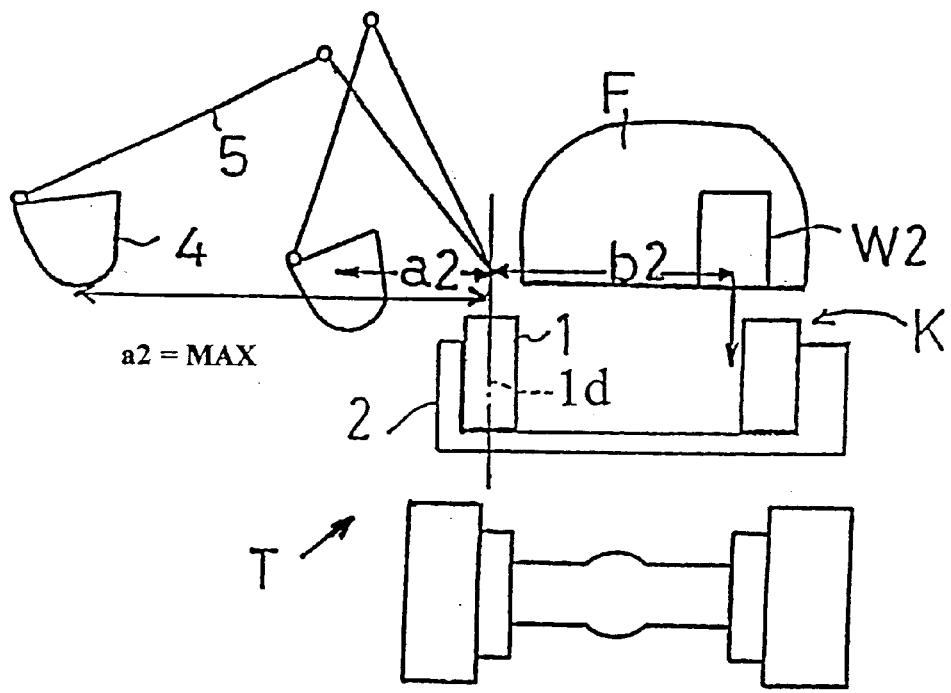
FIG. 3 is a rear view of the swivel working vehicle according to the present invention which is placed on a bed of a dump truck.

When the swivel body F is disposed in a forward position as shown in FIGS. 1 and 2, the weight of the working vehicle along the lateral middle lines 1d of left and right crawlers 1 in contact with the ground surface is equal. If the swivel body F has been rotated at a right angle from the forward position, as shown in FIG. 3, the weight of the working vehicle is still applied onto the lateral middle lines 1d of left and right crawlers 1 that are in contact with the ground surface. However, the relationship between the weight of balance weight W2 and the weight of bucket 4 may become off-balance, wherein the core metal projections 1a of the crawler 1 disposed toward the bucket 4 then serves as a fulcrum, much like a see-saw.

As shown in FIG. 3, the reference numeral b2 designates a fixed horizontal distance between the lateral middle line 1d of the crawler 1 disposed toward the bucket and the balance weight W2. The reference numeral a2 designates a variable horizontal distance between the lateral middle line 1d of the crawler 1 disposed toward the bucket and the bucket 4. The weight of the balance weight W2 is a fixed number w2 and the entire weight of the working device (the boom, arm and bucket) is a fixed number w1. When the relationship "a2×w1<b2×w2" is maintained, the weight of the working vehicle is applied onto both lateral middle lines 1d along the portions of left and right crawlers 1 in contact with the ground surface, so that the stationary vehicle is safe from tilting or failing. However, as the bucket 4 is shifted away from the swivel body F, the variable number a2 increases. Accordingly, the portion of the weight that was applied on the lateral middle line 1d of the crawler 1 toward the balance weight W2 is gradually shifted to the lateral middle line id of the crawler 1 toward the bucket 4. If the relationship between the weight of the bucket 4 and the balance weight W2 becomes "a2×w1=b2×w2", the balance weight W2 and the weight of the working device would be balanced on only the lateral middle line 1d of the crawler 1 toward the bucket 4. In the event that the bucket 4 were shifted further away from the swivel body F from this condition such that the relationship becomes "a2×w1>b2×w2", the working vehicle would tilt or fall toward the bucket 4. To prevent such an occurrence, a small swivelable-type working vehicle is conventionally provided with the balance weight W2 having a sufficient weight w2, so that, even it the bucket 4 achieves the limit away from the swivel body F, the relation "a2×w1<b2×w2" is ensured.

Figure 4:
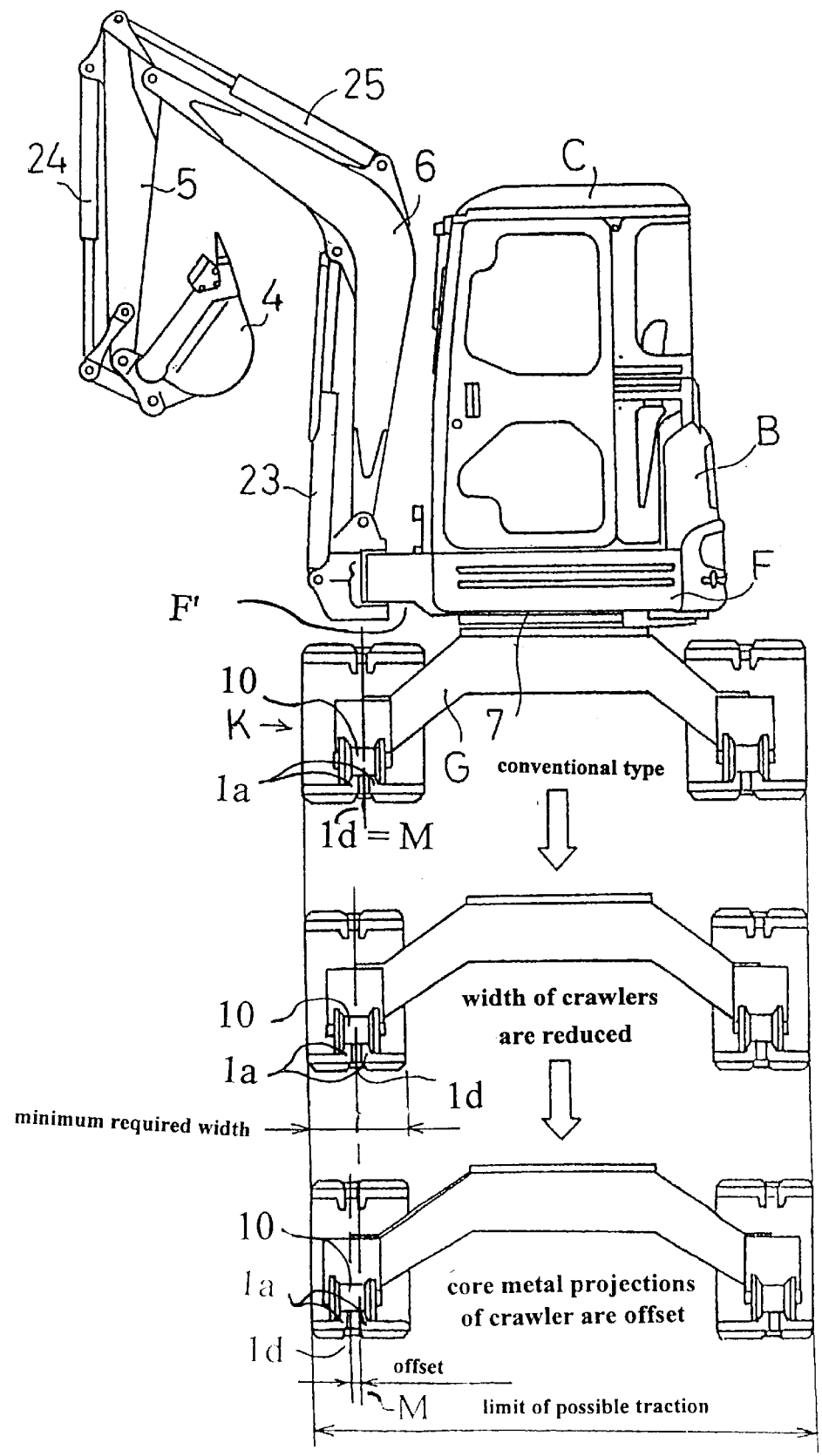
FIG. 4 is a view showing variation of a balanced point P as core metal projections 1a of crawlers 1 are changed.
Figure 5:
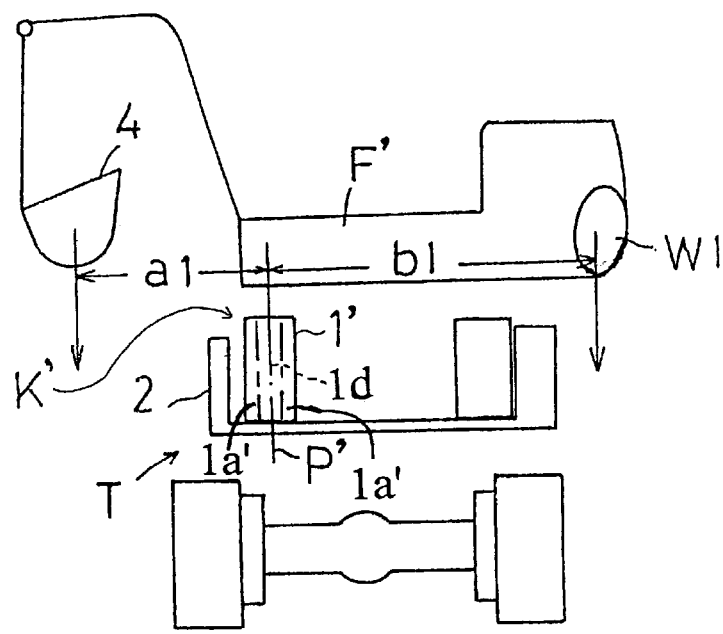
FIG. 5 is a rear view of a hydraulic back-hoe shovel of a conventional swivel working vehicle provided with a swivel body, whose rear portion projects outwardly beyond a lateral width of the traveling devices, placed on the bed of the dump truck.

Referring to the uppermost figure of FIG. 4, the left and right traveling devices K are applied to a conventional back-hoe with a small swiveling capacity. Each crawler 1 is relatively wide. Furthermore, the left and right core metal projections 1a are aligned on substantially a middle portion of each crawler 1, so that the "lateral middle" line 1d actually corresponds with a middle line M of the crawler 1. Thus, the vehicle using this type of traveling devices K must be provided with a considerably heavy balance weight W2 because the lateral distance between the lateral middle lines 1d of left and right crawlers 1 is shorter so as to make the distance b2 relatively short.

With reference to the middle figure of FIG. 4, the left and right traveling devices K are applied to a back-hoe with a small swiveling capacity wherein each crawler 1 is narrower than the conventional crawler to the limit of its necessary width. However, the "lateral middle" line 1d still corresponds with the middle line M of each crawler 1 but is shifted laterally outward from the conventional middle Line M of the wider crawler 1 shown in the uppermost figure of FIG. 4, so that the distance b2 can be longer.

With reference to the lowermost figure of FIG. 4, the left and right traveling devices represent the left and right traveling devices K of the present invention. Each crawler 1 has a lateral edge which is the furthermost outer edge of the crawler with respect to the center of rotation of the swivel body and a medical edge which is the inner edge of the crawler opposite the lateral edge. Further, each of the narrower crawlers 1 of the traveling devices shown in the middle figure of FIG. 4 is also provided with the left and right core metal projections 1a aligned along the lateral middle line 1d that is offset toward the lateral edge of the crawler 1 from the longitudinal middle line M of the crawler 1. Therefore, the distance b2 is made even longer. Thus, in the present invention even if the bucket 4 is shifted away from the swivel body F so that a2 is at its maximum length and the balance weight W2 is considerably lighter than the conventional back-hoe with a small swivel capacity, the relation "a2×w1<b2×w2" is ensured. Thus, in accordance with the present invention, by laterally offsetting the alignment of the left and right core metal projections of each crawler from the longitudinal middle Line of the crawler the stability of the vehicle is increased even though the weight w2 of the balance weight W2, which is set so as to prevent the vehicle from tilting and falling even when the bucket is shifted to its furthest position form the swivel body, is made relatively light, thereby reducing the cost of the vehicle.

Figure 9:
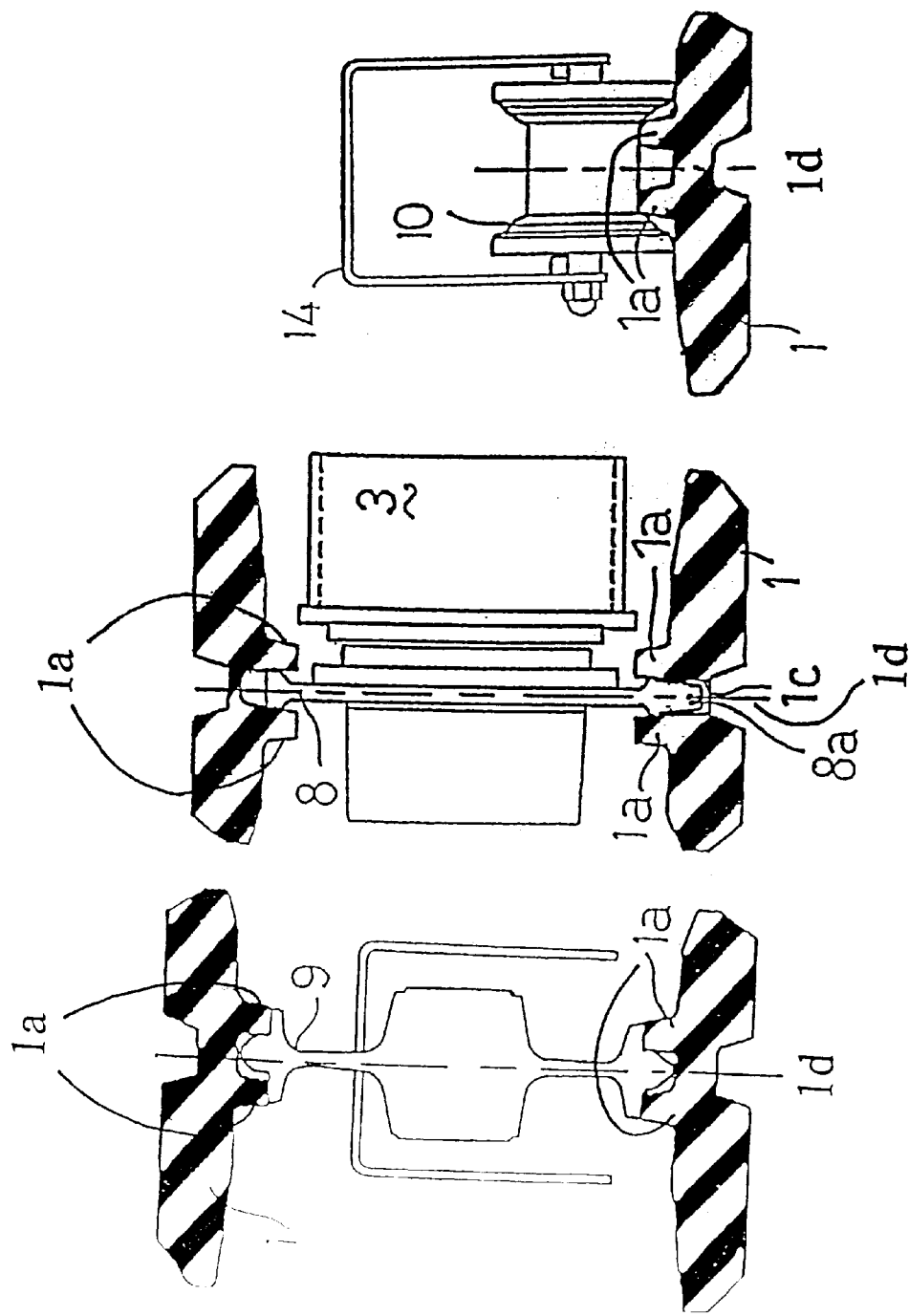

Referring to FIG. 9, three portions of the crawler 1, having the laterally offset left and right core metal projections 1a aligned on lateral middle lines 1d, are shown. Particularly, the portion of the crawler 1 with the roller 10 and a roller frame 14, the portion of the crawler 1 with a sprocket wheel 8 and a motor 3, and the portion of the crawler 1 with an idler 9. Further, teeth 8a of the rotatable sprocket wheel 8 are engaged into engaging holes 1c formed in the crawler 1 between the left and right core metal projections 1a thereof, so as to drive the crawler 1. The roller 10 rotatably abuts against the tops of the left and right core metal projections 1a and the outer flanges of the roller 10, which sandwich the left and right core metal projections 1a, abut against the crawler 1 so as to press the crawler downward, thereby further increasing its stability.

Figure 6:
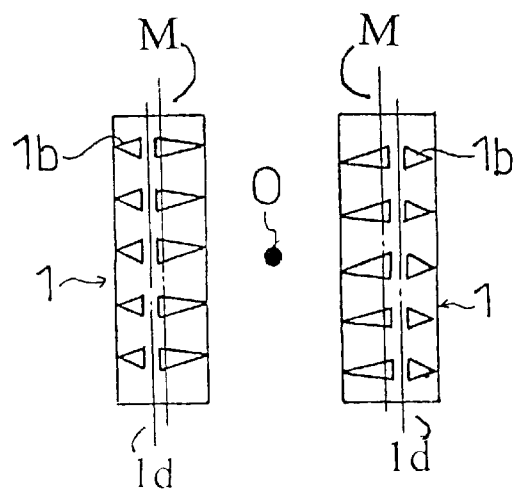
FIG. 6 is a schematic plan view of left and right crawlers 1 whose lugs are formed so as to assume point symmetrical shapes about a swivelling center.
Figure 7:
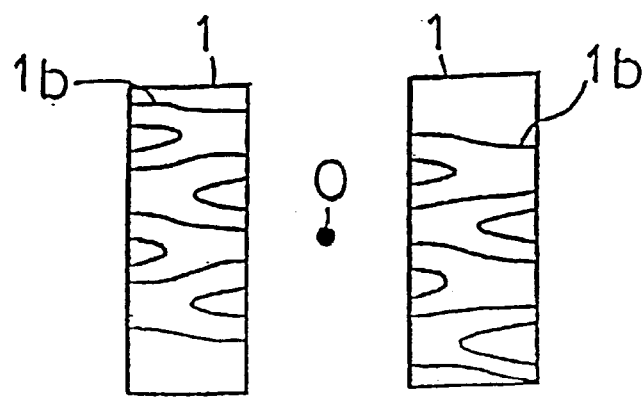
FIG. 7 is a schematic plan view of similar left and right crawlers 1 according to another embodiment.

With the left and right core metal projections 1a being laterally offset along lateral middle line 1d toward the lateral edge of the crawler 1 boom the longitudinal centerline thereof, the right and left core metal projections of a particular crawler are not symmetrical about lateral middle line 1d of that crawler 1. Thus, a common crawler member cannot be used for both left and right crawlers. For solving this problem according to the present invention, the right and left lugs 1b formed on an outer peripheral surface of the crawler 1 are formed of symmetrical shapes about the rotational center O of the swivel 7, as shown in FIGS. 6 and 7. Accordingly, the same crawler member made in accordance with the present invention can be used for both of the left and right crawlers 1, thereby reducing the cost to produce them. Also, since the left and right crawlers 1 can be replaced with each other in correspondence to the degree of wear of the lugs 1b, the useful life of the crawlers 1 can he prolonged and the handling thereof can be improved.

Figure 8:
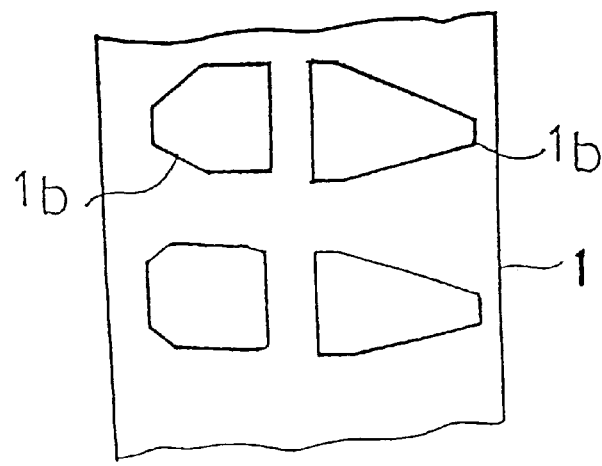

In such a construction, the left and right lugs in which the laterally offset left and right core metal projections 1a are disposed may differ in their adhesion so that a problem may arise with insufficient adhesion of the rubber crawler 1. To solve this problem, the left and right lugs 1b may be constructed so as to occupy the same area, as shown in FIG. 8.

Another problem caused by the laterally offset left and right core metal projections 1a of the rubber crawler 1 is that steel cords 17 cannot be uniformly spaced to the left and right of lateral middle line 1d. However, as shown in FIG. 10, the same number of the steel cord's 17 may be disposed to the left and right of lateral middle line 1d by making the spaces between the left steel cords 17 different from the spacing between the right steel cords 17, thereby maintaining the strength of the rubber crawler 1 imparted by the steel cords 17.

Figure 11:
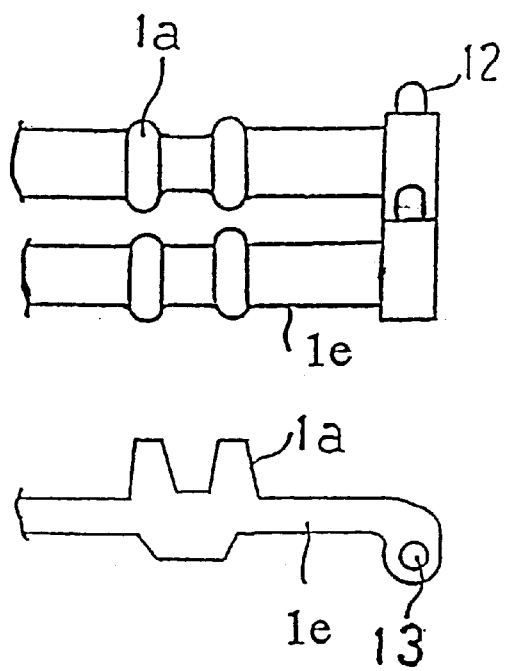
FIG. 11 includes a fragmentary front view and a fragmentary plan view of the crawler 1 comprising crawler pieces integrally connected with one another through engaging of convexes 12 and concaves 13 in front and rear of the core metals.
Figure 12:
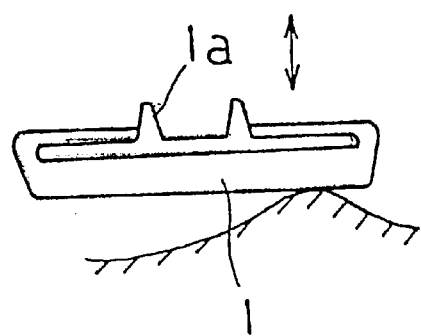
FIG. 12 is a sectional front view of the crawler 1 showing the effect of such a construction as shown in FIG. 11, wherein the crawler pieces 1 are connected font and behind through engaging of convexes 12 and concaves 13.

Referring to the rubber crawler 1 shown in FIGS. 11 and 12, it is comprised of a plurality of flexible rubber crawler pieces 1e that are connected with each other by engagement of a respective convex portion 12 provided on an end of each crawler piece 1e with a respective concave portion 13 provided on an end of each adjoining crawler piece 1e. Thus, even if the rubber crawler 1 is astride a projection of the ground or a stone on the ground, which is laterally eccentrically positioned with regard to the crawler 1, as shown in FIG. 12, each rubber crawler piece 1e does not become deformed, thereby preventing the rubber crawler 1 from bending to one side thereof.

Figure 13:
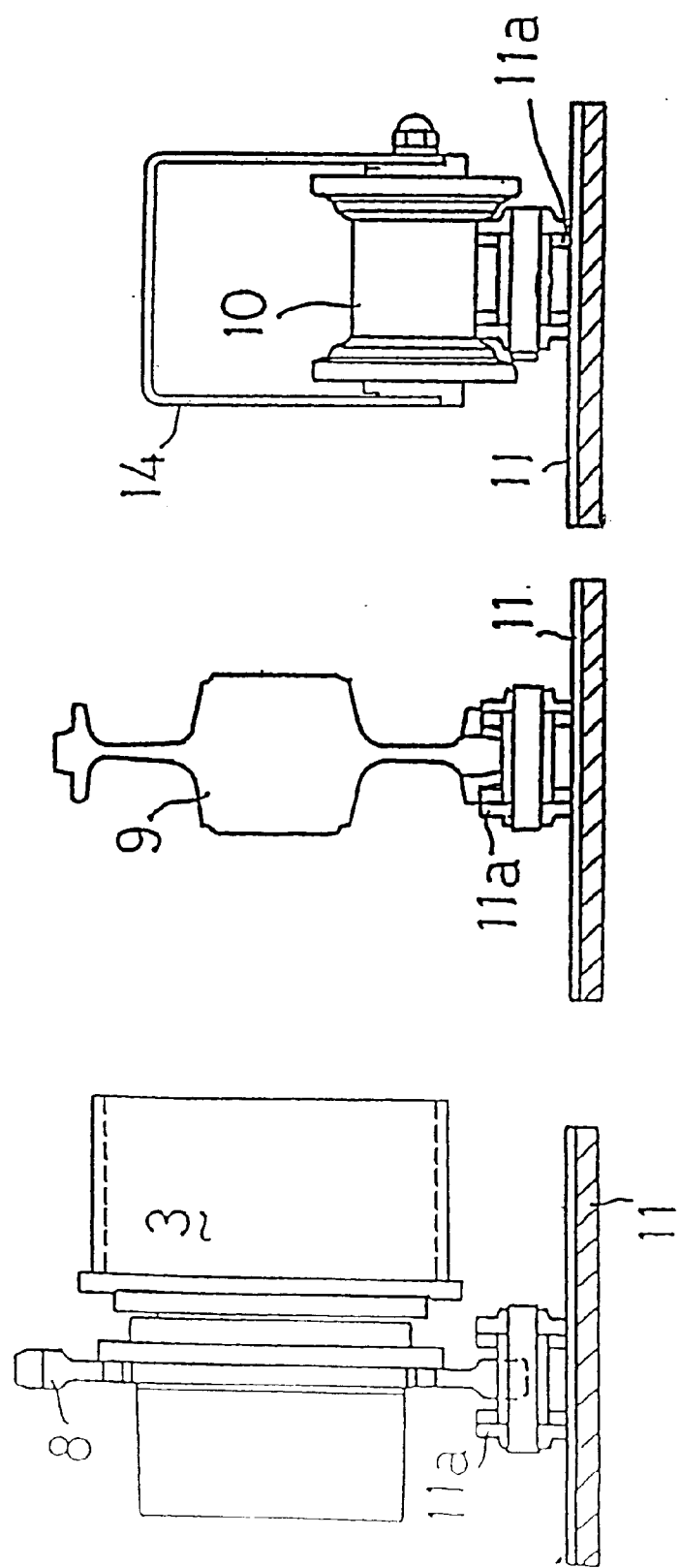

The present invention primarily refers to embodiments with the rubber crawler 1, however, the swivel working vehicle of the present invention may be adapted for use with an iron crawler 11, as shown in FIG. 13. Referring to FIG. 13, the iron crawler 11, having outside eccentric balanced point P by outside offsetting engaging projections 11a thereof, is shown in relation with the sprocket wheel 8, the idler 9 and the roller 10.

Figure 14:
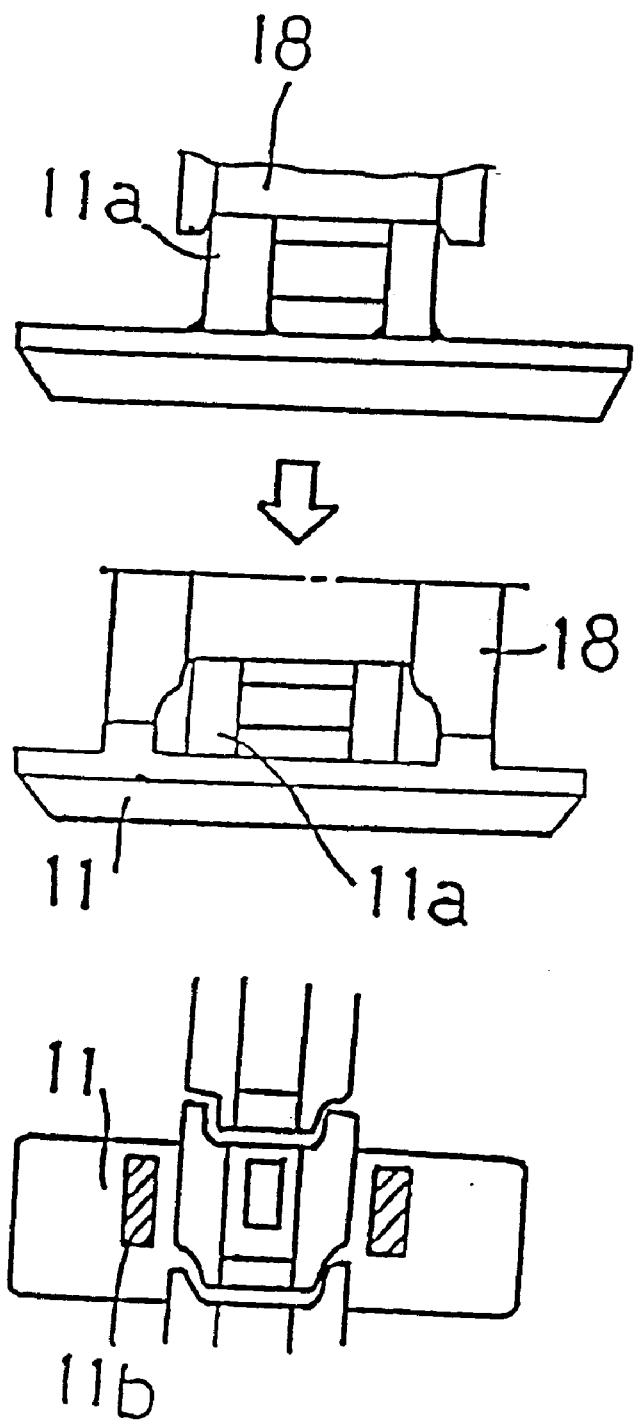
FIG. 14 includes a fragmentary front view and a fragmentary plan view of the iron crawler 11 showing constructions of the engaging projections 11a and the roller 18.
Figure 15:
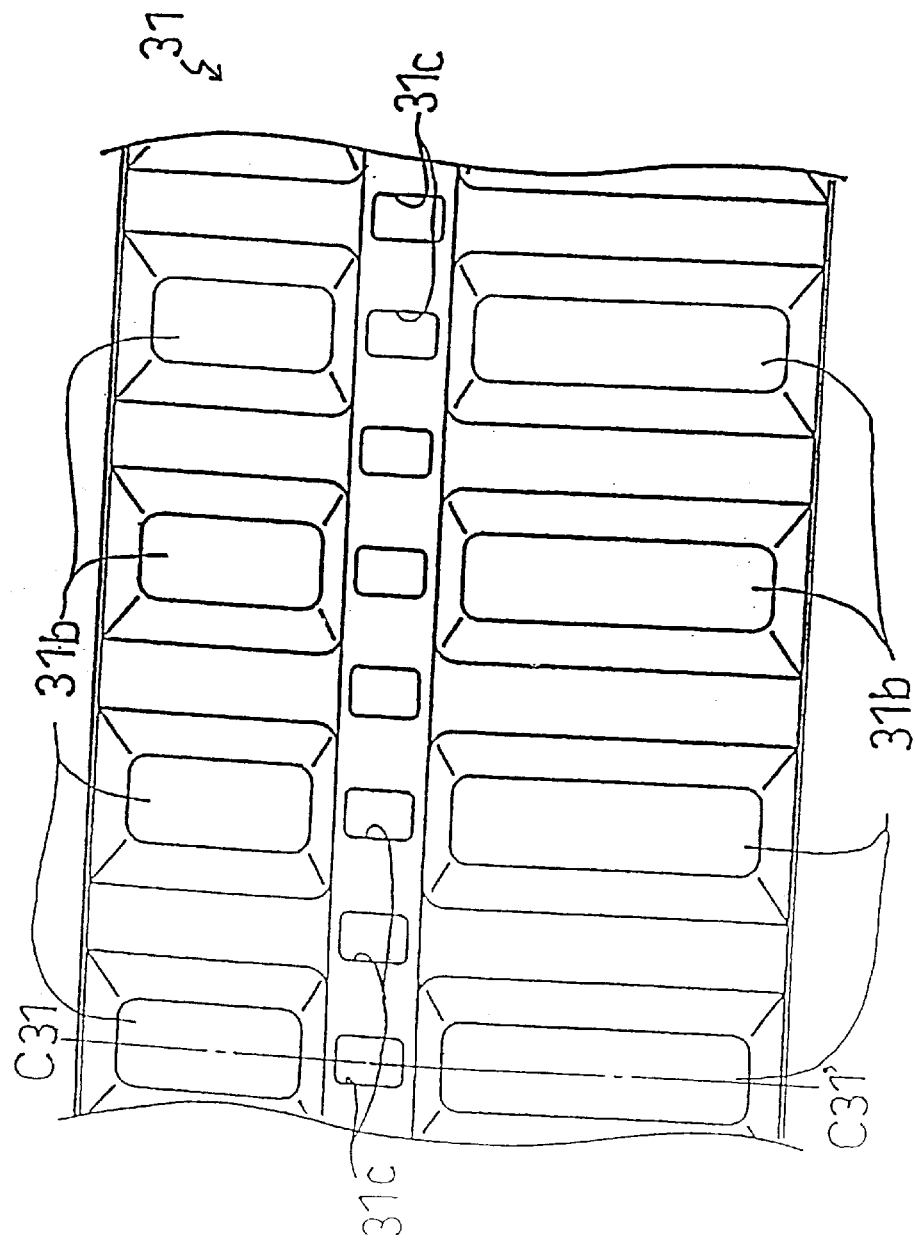
FIG. 15 is a front view of a crawler 31 showing an embodiment about shapes of lugs.

Referring to FIG. 14, an iron crawler piece 11 is shown with a roller 18. In the uppermost drawing of FIG. 14, both side wheels of a conventional roller 19 do not abut against the iron crawler piece 11. According to the embodiment of the present invention as shown in the middle and lowermost drawings in FIG. 14, both side wheels of the roller 18 are made to have a large diameter and upward projections are formed in the upper surface of the iron crawler piece 11. Thus, the large diameter side wheels of the roller 18 can abut against the upward projections of the iron crawler piece 11, thereby preventing the iron crawler 11 from dislodging and improving the endurance thereof.

Particular embodiments of the rubber crawler 1 are now described (it is simply called a crawler hereinafter). As described according to FIGS. 15 to 38, crawlers 31 to 49 are provided with left and right core metal projections offset from the lateral center and are provided on the periphery surface thereof with left and right lugs which assume symmetrical shapes about the rotational center O of the swivel 7. In this regard, only a crawler 44 is described according to a front view, back view, right and left side views, a plan view and a partial sectional bottom view (FIGS. 28 to 33). The remaining crawlers are described according to only a front view so as to show respective front shapes thereof.

Crawlers 31, 33, 35, 37, 39, 41, 43 and 45 (as shown in FIGS. 15, 17, 19, 21, 23, 25, 27 and 45 respectively) have lugs formed on a lateral side thereof about the core metal projections 1a that are disposed at the same longitudinal position as the lugs formed on a medial side thereof. Further, each crawler 31, 33, 35, 37, 39, 41, 43 and 45 forms a pair of left and right core metal projections 31a, 33a, 35a, 37a, 39a, 41a, 43a and 45a laterally offset from the longitudinal centerline thereof.

On the inner surface of each crawler 31, 33, 35, 37, 39, 41, 43 and 45, between each pair of left and right core metal projections, is formed each engaging hole 31c, 33c, 35c, 37c, 39c, 41c, 43c and 45c so as to engage with each of the teeth 8a of the sprocket wheel 8. On the outer peripheral surface of each crawler are formed respective left and right lugs 31b, 33b, 35b, 37b, 39b, 41b, 43b and 45b that are symmetrically shaped about the rotational center O of the swivel 7.

In each of the crawlers 33, 35, 37, 39, 41, 43 and 45, the respective left and right lugs 33b, 35b, 37b, 39b, 41b, 43b and 45b have the lengths in the longitudinal direction of the crawler that are reduced as they approach the outer edges of the crawler. Due to this shape of the lugs, soil or other contaminants between the lugs can easily be swept out toward each edge of the crawler as the vehicle travels, thereby reducing the amount of contamination carried by the rotating crawler.

Crawler 31 has lugs 31b having the same longitudinal length over the whole of the lateral width thereof which also enables good soil sweeping, thereby reducing the contaminations carried by the rotating crawler.

Figure 25:
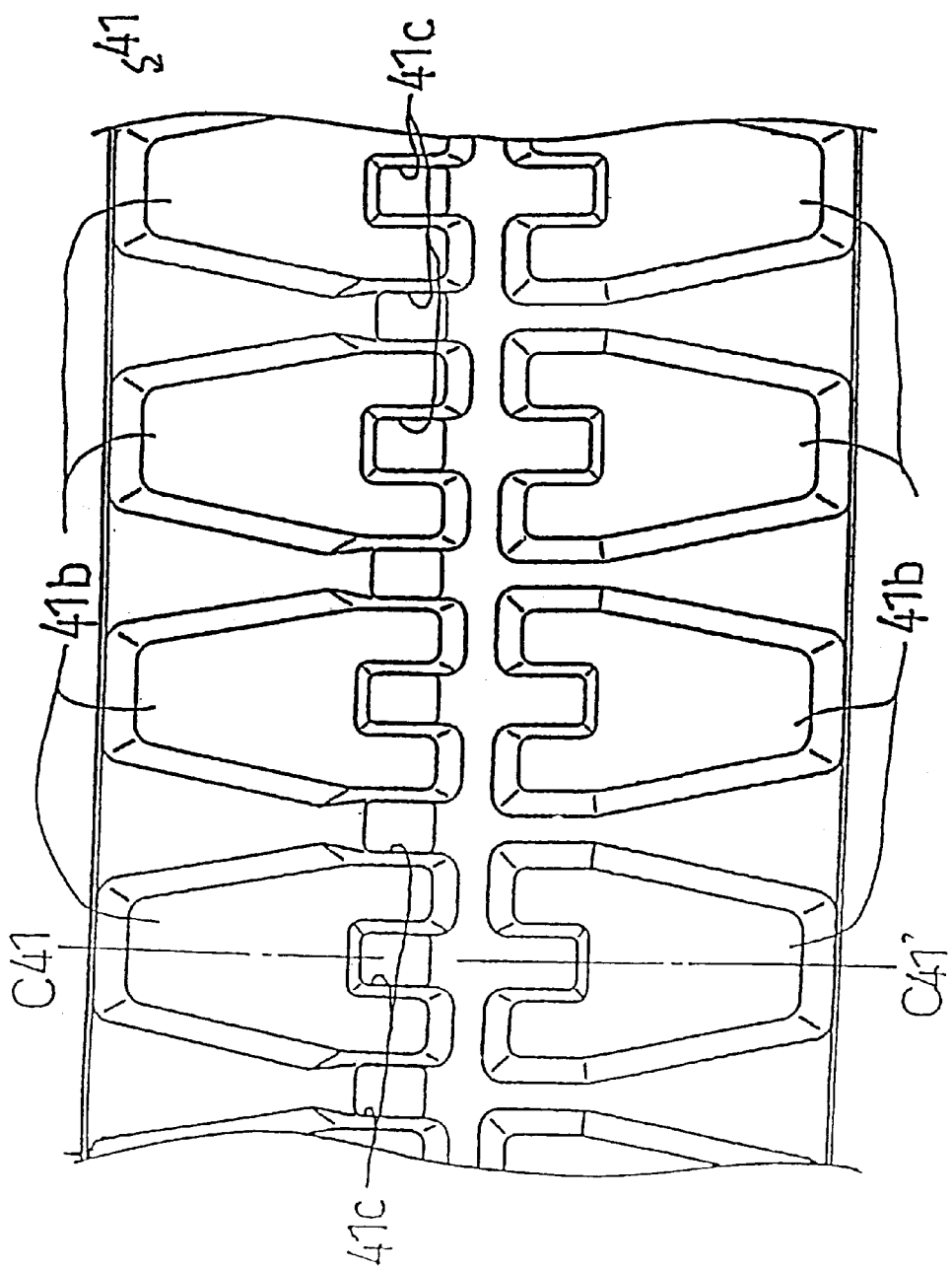
FIG. 25 is a front view of a crawler 41 showing still another embodiment about the same.
Figure 34:
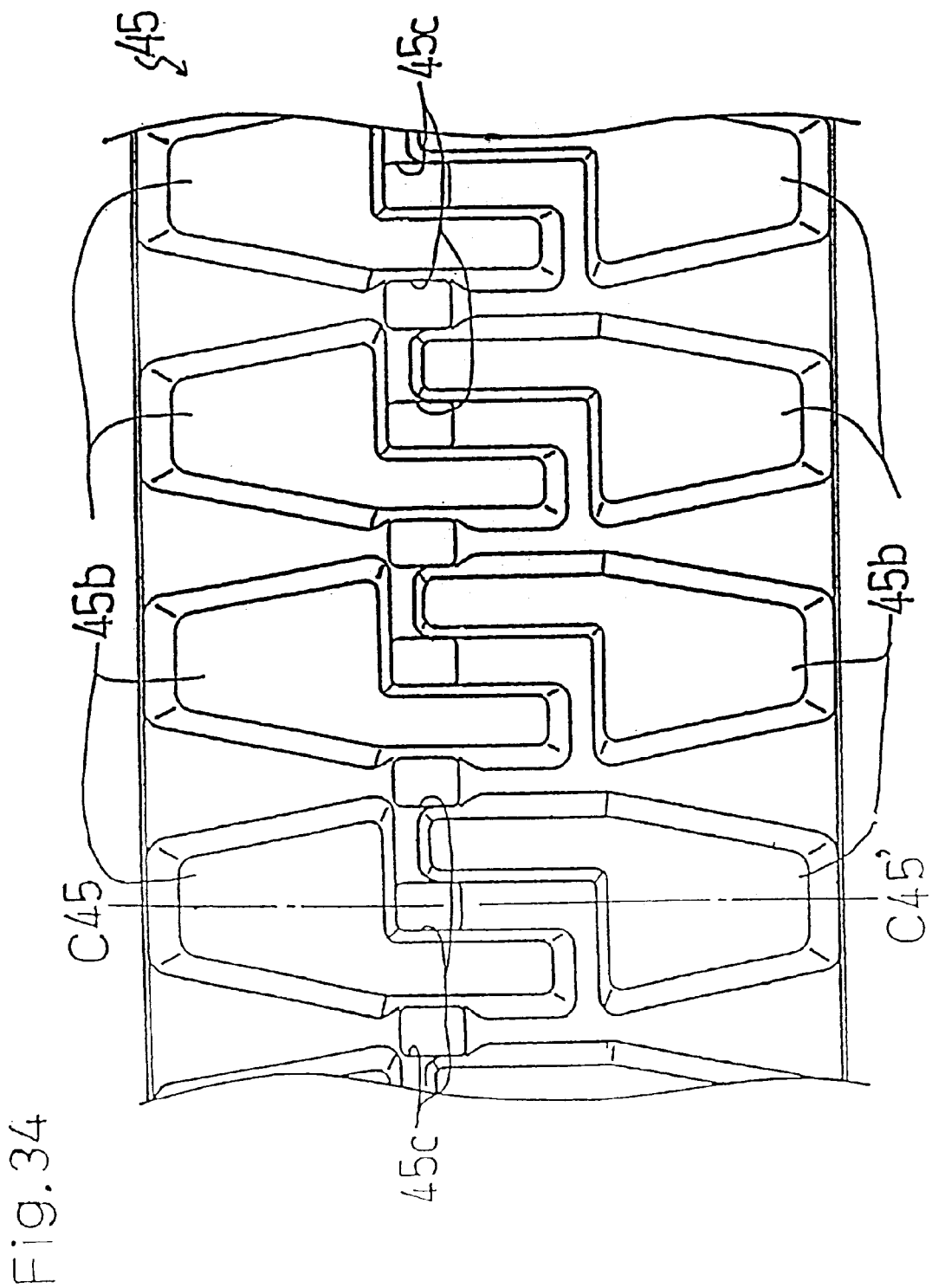
FIG. 34 is a front view of a crawler 45 showing still another embodiment about shapes of lugs.
Figure 35:
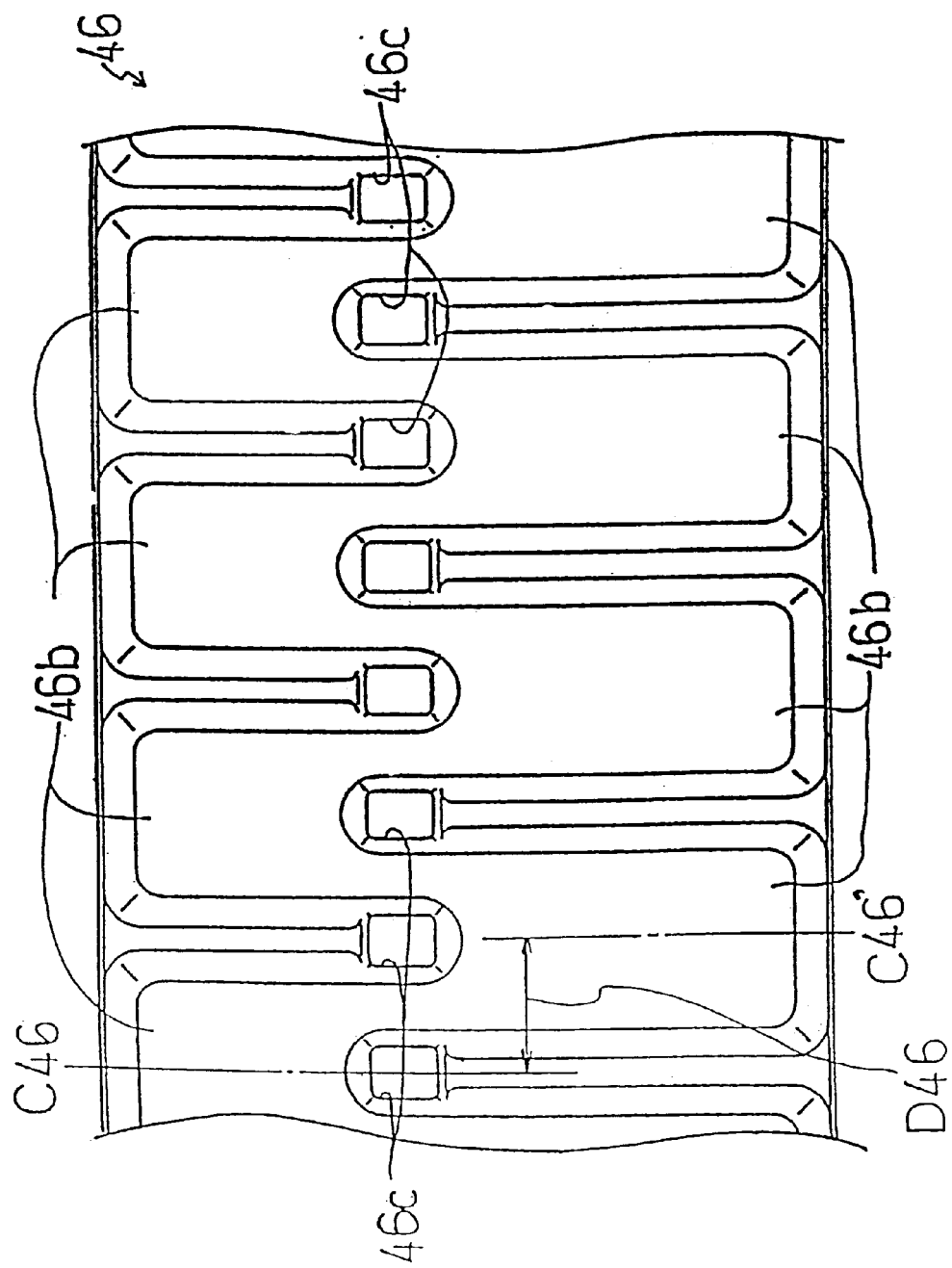
FIG. 35 is a front view of a crawler 46 showing still another embodiment about the same.
Figure 36:
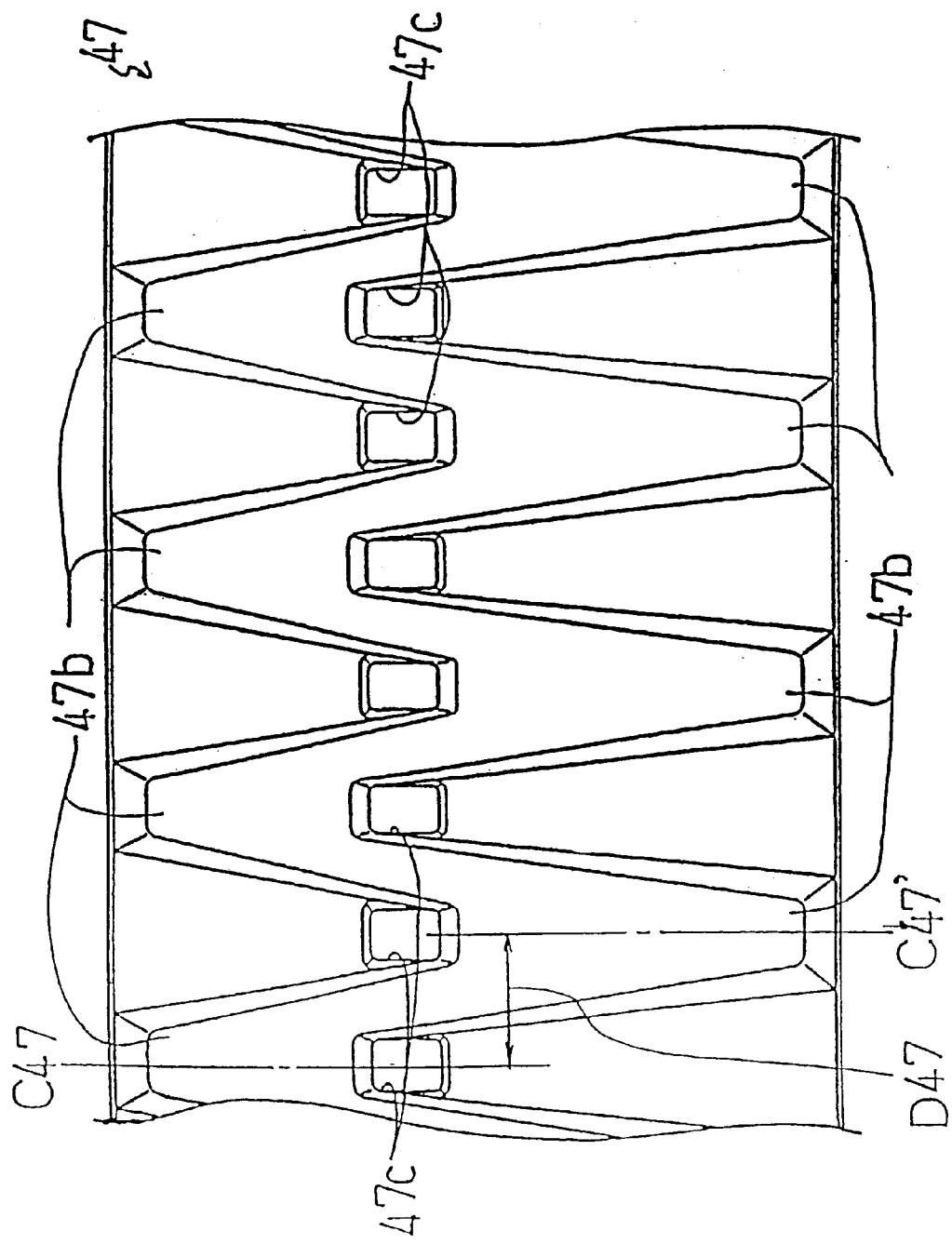
FIG. 36 is a front view of a crawler 47 showing still another embodiment about the same.
Figure 37:
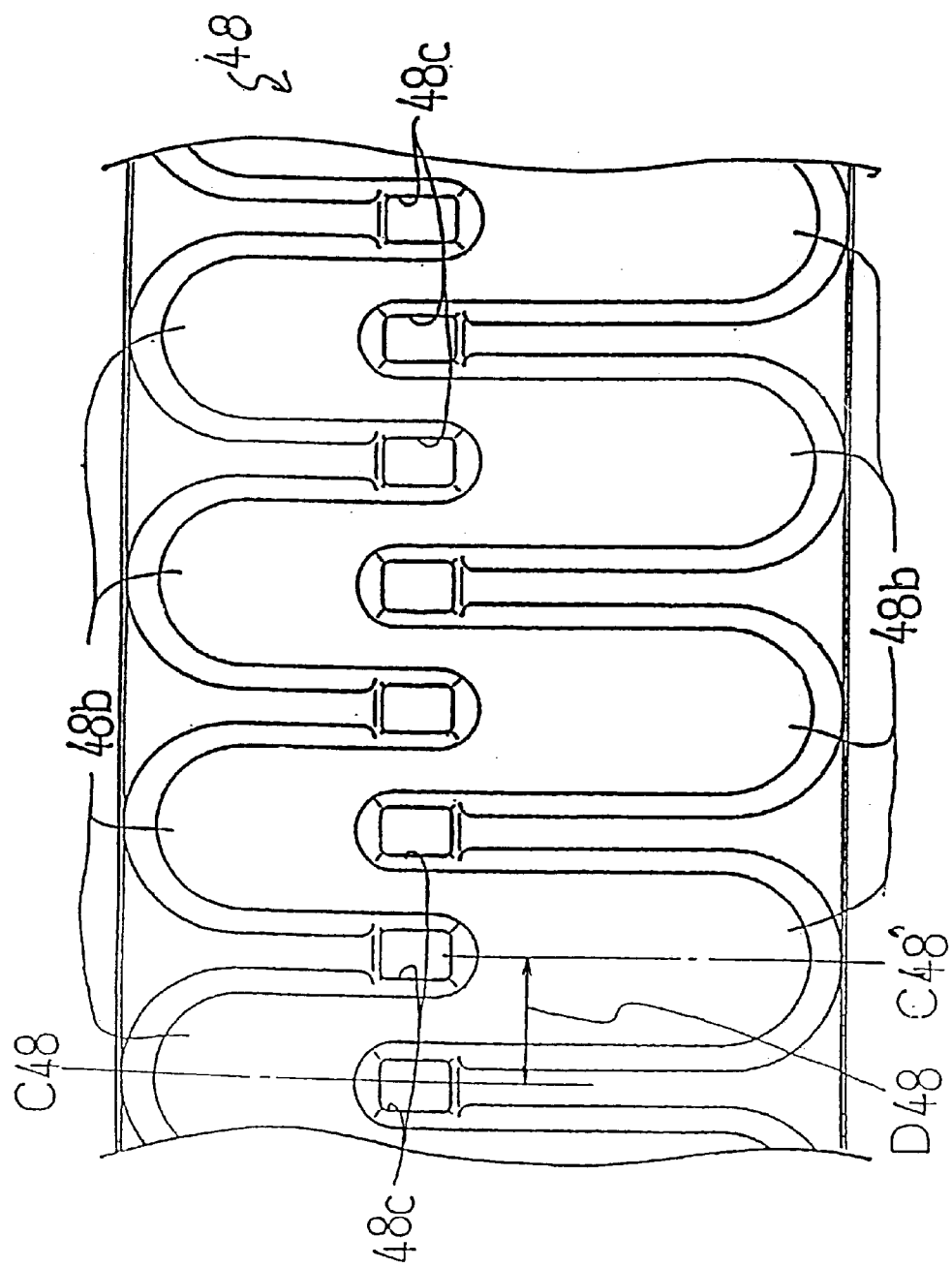
FIG. 37 is a front view of a crawler 48 showing still another embodiment about the same.
Figure 38:
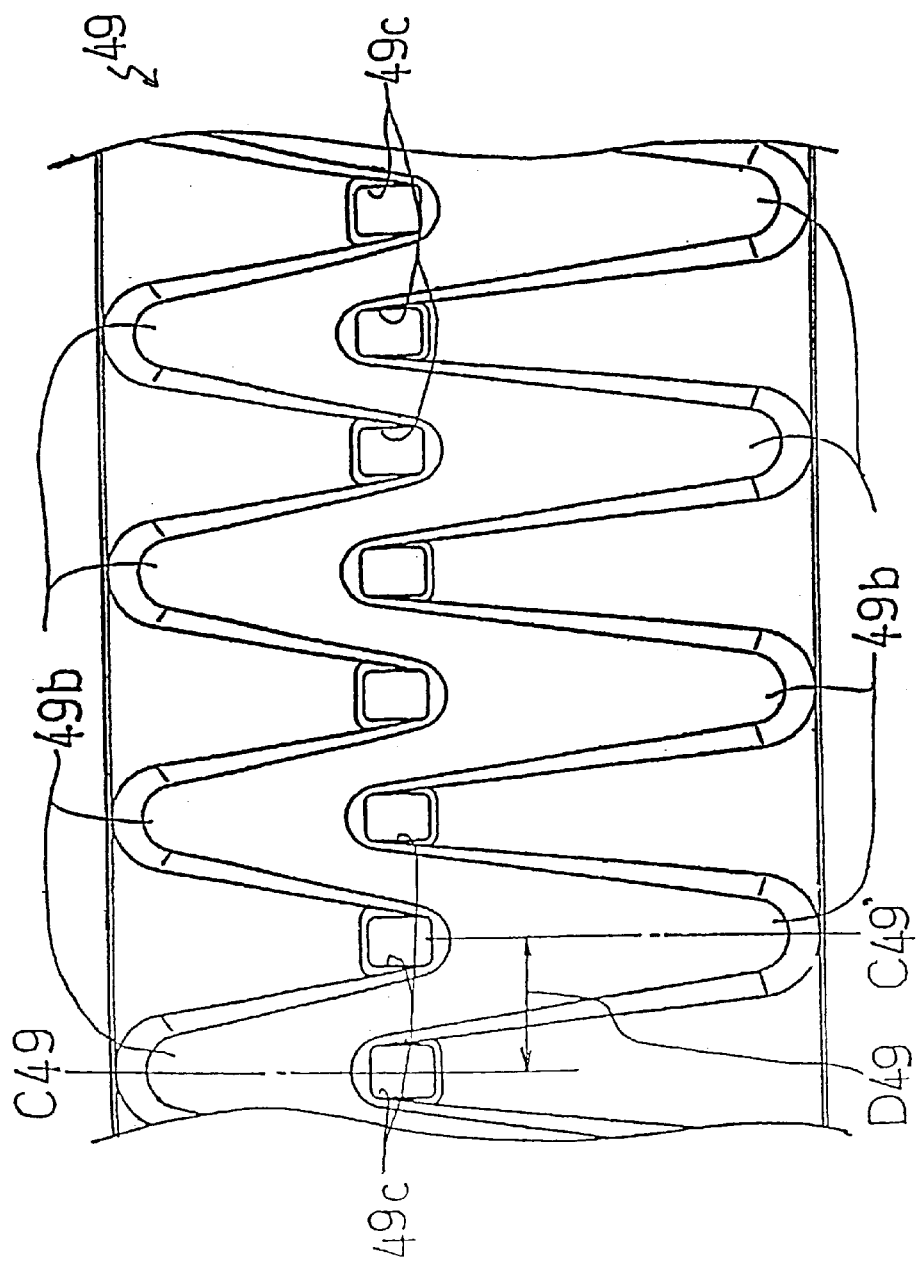
FIG. 38 is a front view of a crawler 49 showing still another embodiment about the same.

The area of each left lug 41b and 45b of respective crawlers 41 (as shown in FIG. 25) and 45 (as shown in FIG. 34) is substantially the same as the area of each right lug 41b and 45b so as to mike the adhesive areas and pressures of the left and right lugs substantially identical, thereby reducing and/or preventing the inside eccentric abrasion of respective left and right lugs. Thus, the vehicle can travel with stability at all times and the endurance of the crawlers 41 and 45 is prolonged.

As mentioned above, each crawler 31, 33, 35, 37, 39, 41, 43 and 45 is provided with respective lugs 31b, 33b, 35b, 37b, 39b, 41b, 43b and 45b of which ones formed on the lateral side thereof are disposed at the same longitudinal position of the crawler with ones on the medial side thereof. In this regard, each of the respective longitudinal center lines C31, C33, C35, C37, C39, C41, C43 and C45 provided on the lateral side of lugs 31b, 33b, 35b, 37b 39b, 41b, 43b and 45b is coincident in the lateral direction of the crawler with each of the respective longitudinal center lines C31', C33', C35', C37', C39', C41', C43' and C45' provided for each of the medial side lugs 31b, 33b, 35b, 37b, 39b, 41b, 43b and 45b. Due to this construction as the swivel working vehicle travels, each of the left and right lugs of the crawler touch the ground simultaneously, thereby increasing the driving power of the vehicle.

Crawlers 32, 34, 36, 38, 40, 42, 44, 46, 47, 48 and 49 (as shown in FIGS. 16, 18, 20, 22, 24, 26, 28, 35, 36, 37 and 38 respectively) have lugs formed on the lateral side thereof that are offset in the longitudinal direction of the crawler about the left and right core metal projections 1a from the lugs formed on the medial side thereof. Each crawler 32, 34, 36, 38, 40, 42, 44, 46, 47, 48 and 49 forms a pair of left and right core metal projections 32a, 34a, 36a, 38a, 40a, 42a, 44a, 46a, 47a, 48a or 49a laterally offset from the longitudinal center thereof.

On the inner surface of each crawler, between each pair of left and right core metal projections is formed each engaging hole 32c, 34c, 36c, 38c, 40c, 42c, 44c, 46c, 47c, 48c and 49c which is formed to engage with each of the teeth 8a of the sprocket wheel 8. On the outer peripheral surface of each crawler are formed left and right lugs 32b, 34b, 36b, 38b, 40b, 42b, 44b, 46b, 47b, 48b and 49b that are symmetrically shaped about the rotational center O of the swivel 7.

Figure 16:
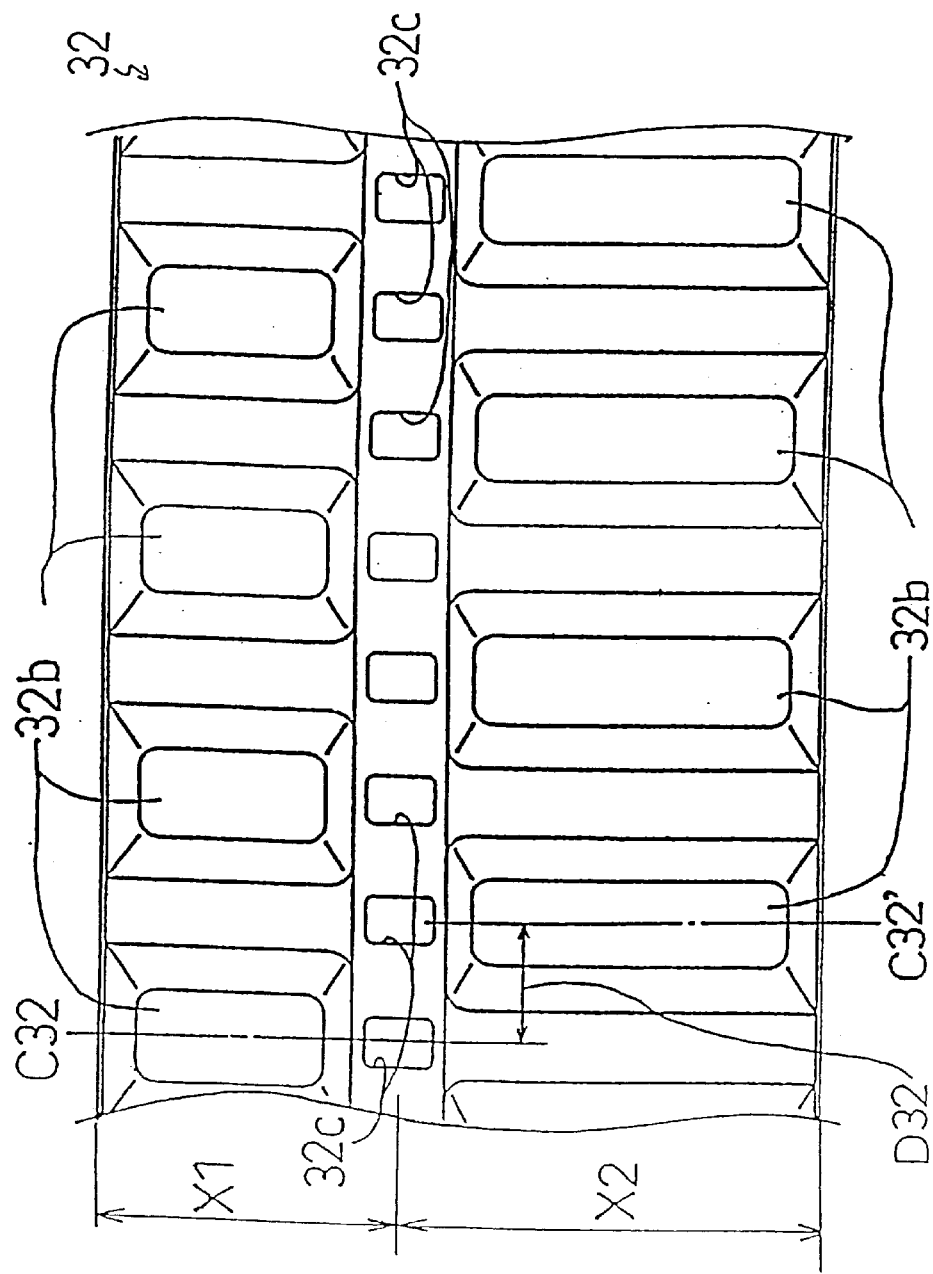
FIG. 16 is a front view of a crawler 32 showing another embodiment about the same.
Figure 17:
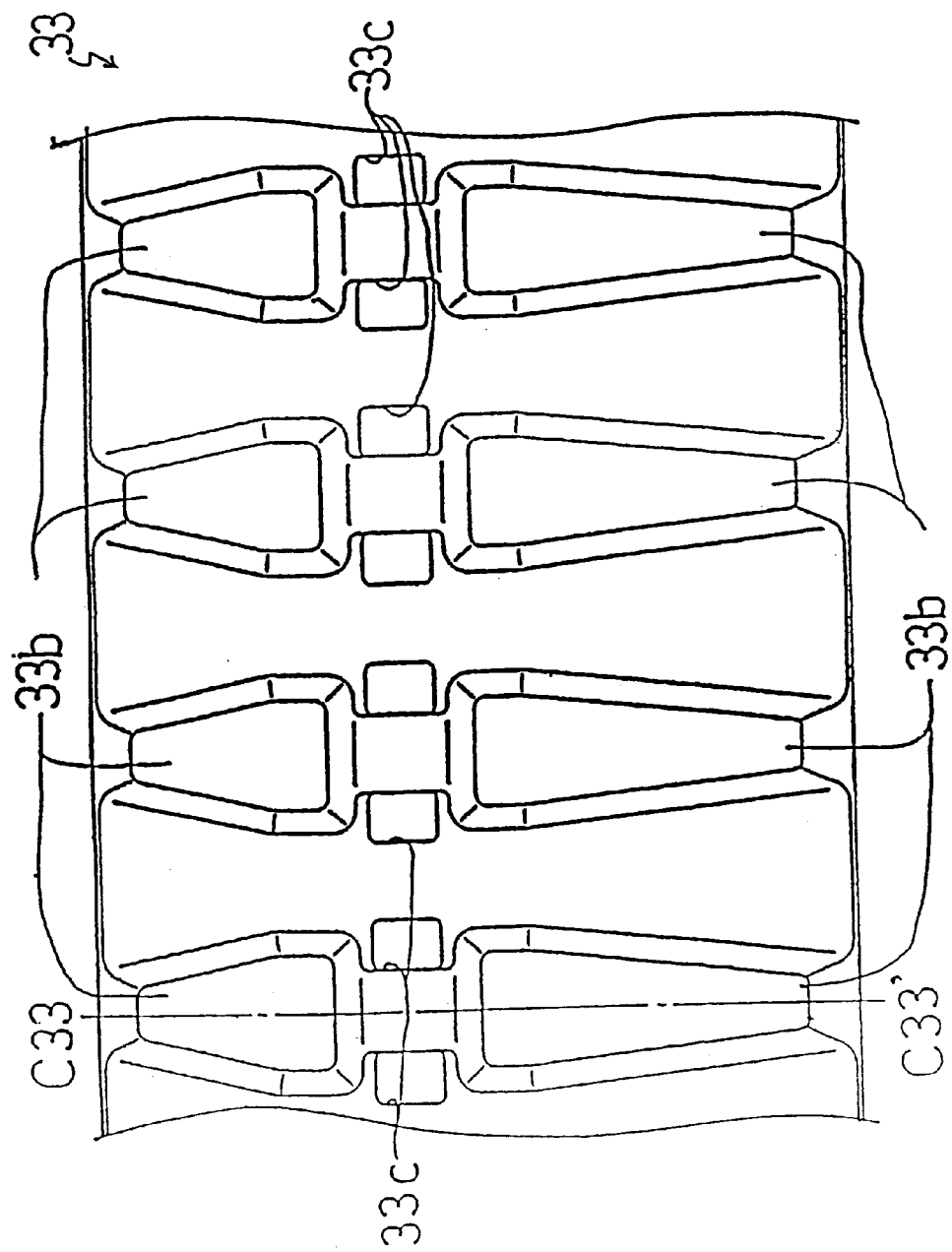
FIG. 17 is a front view of a crawler 33 showing still another embodiment about the same.
Figure 18:
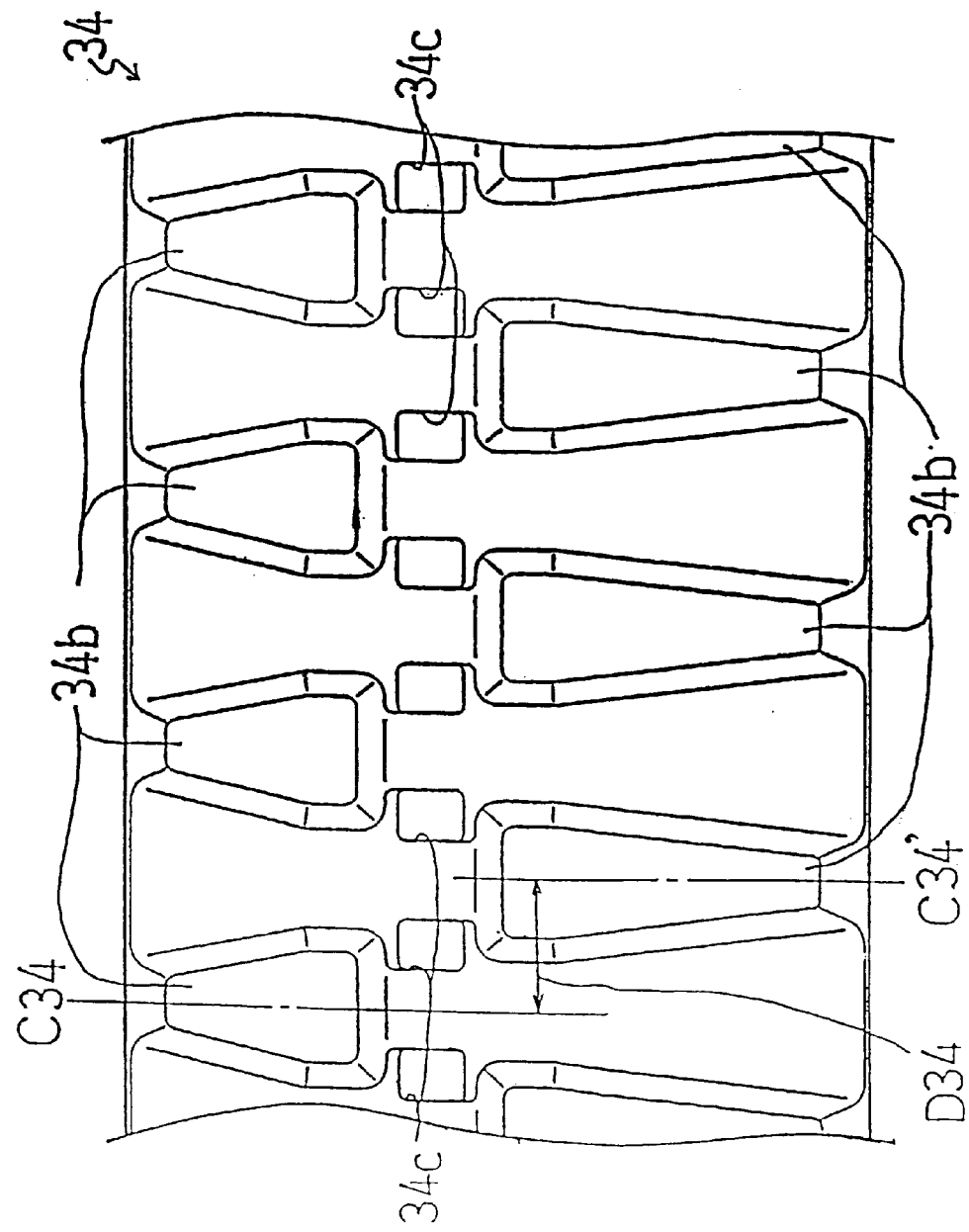
FIG. 18 is a front view of a crawler 34 showing still another embodiment about the same.
Figure 19:
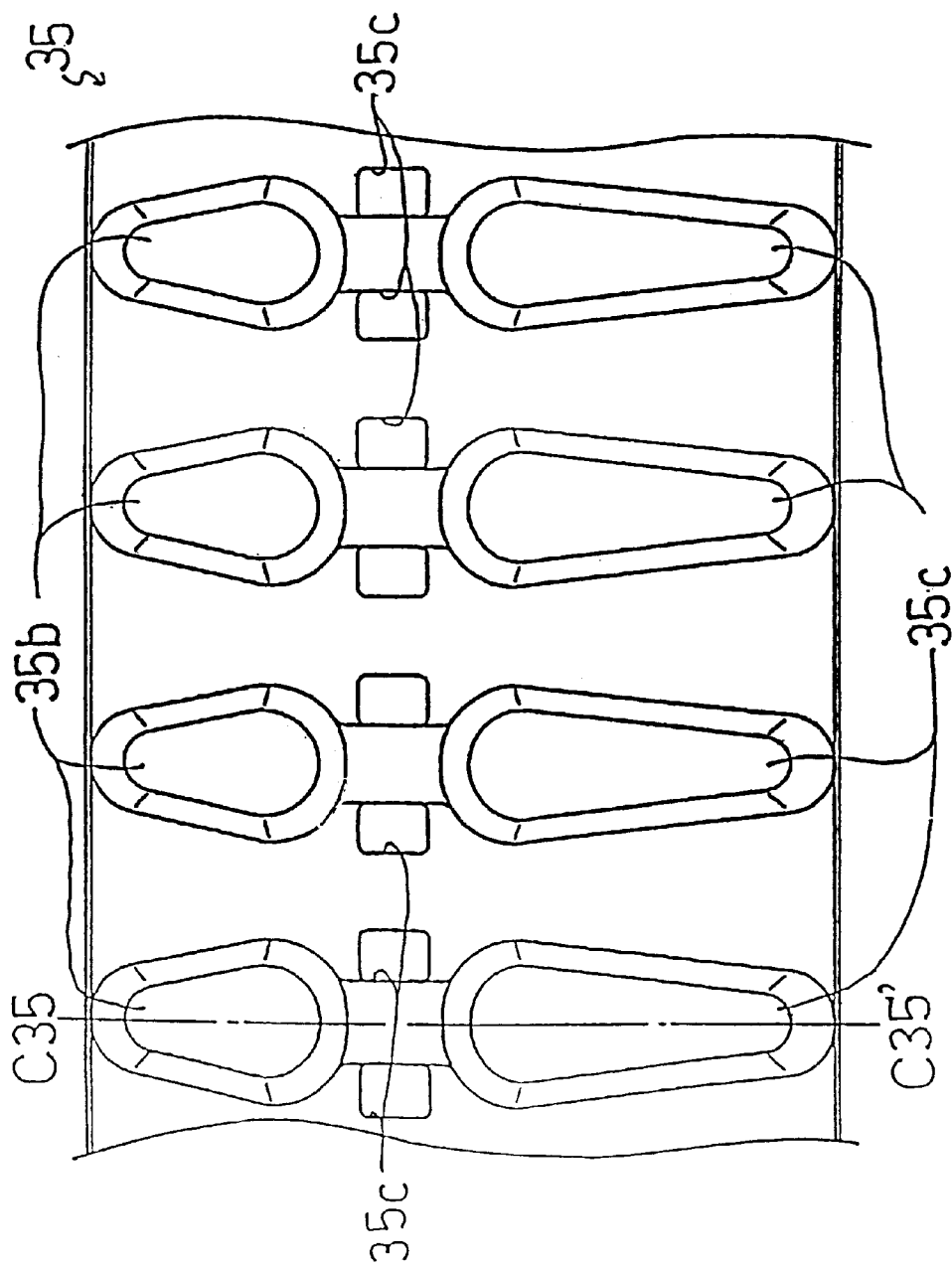
FIG. 19 is a front view of a crawler 35 showing still another embodiment about the same.
Figure 20:
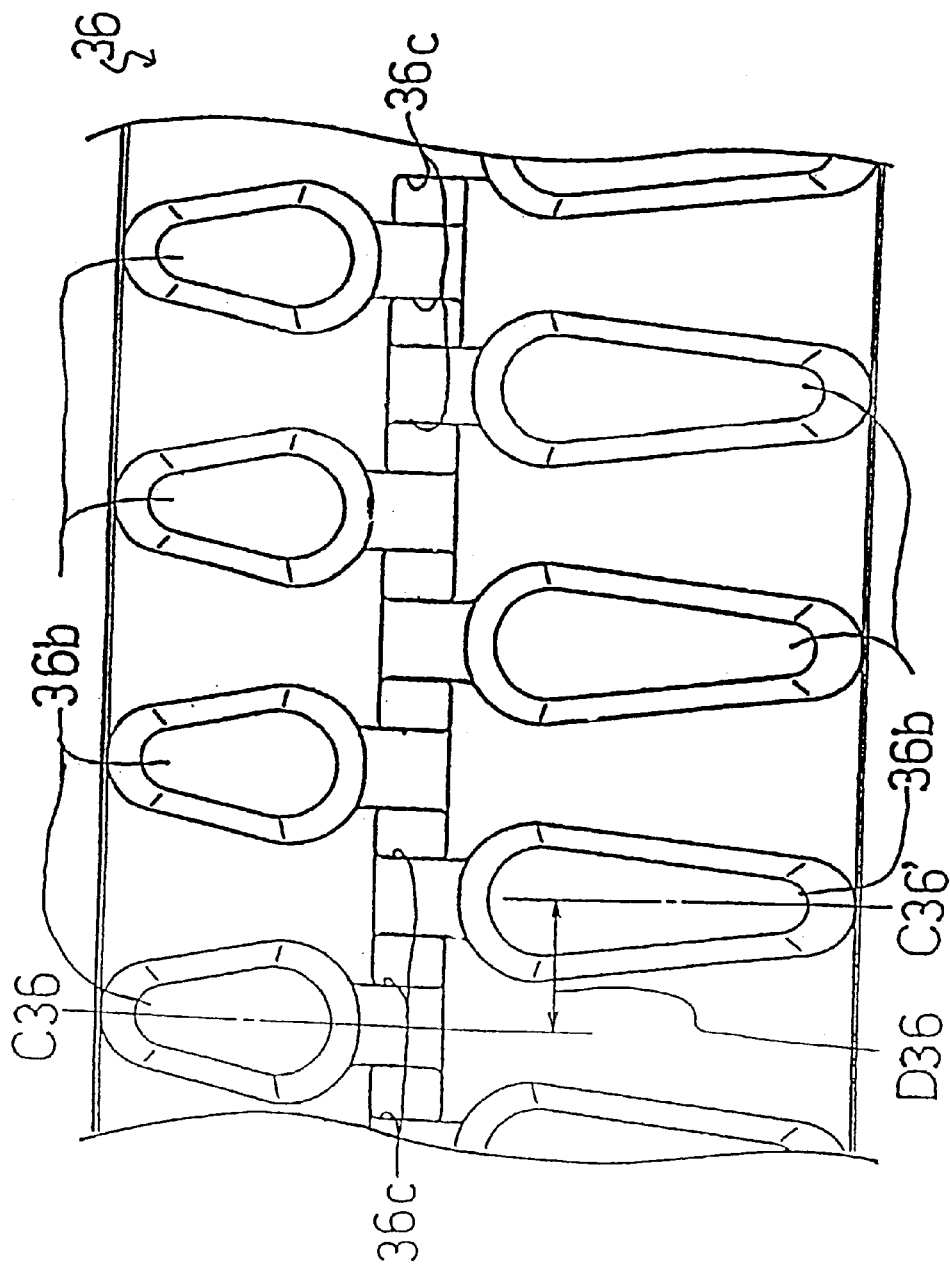
FIG. 20 is a front view of a crawler 36 showing still another embodiment about the same.
Figure 21:
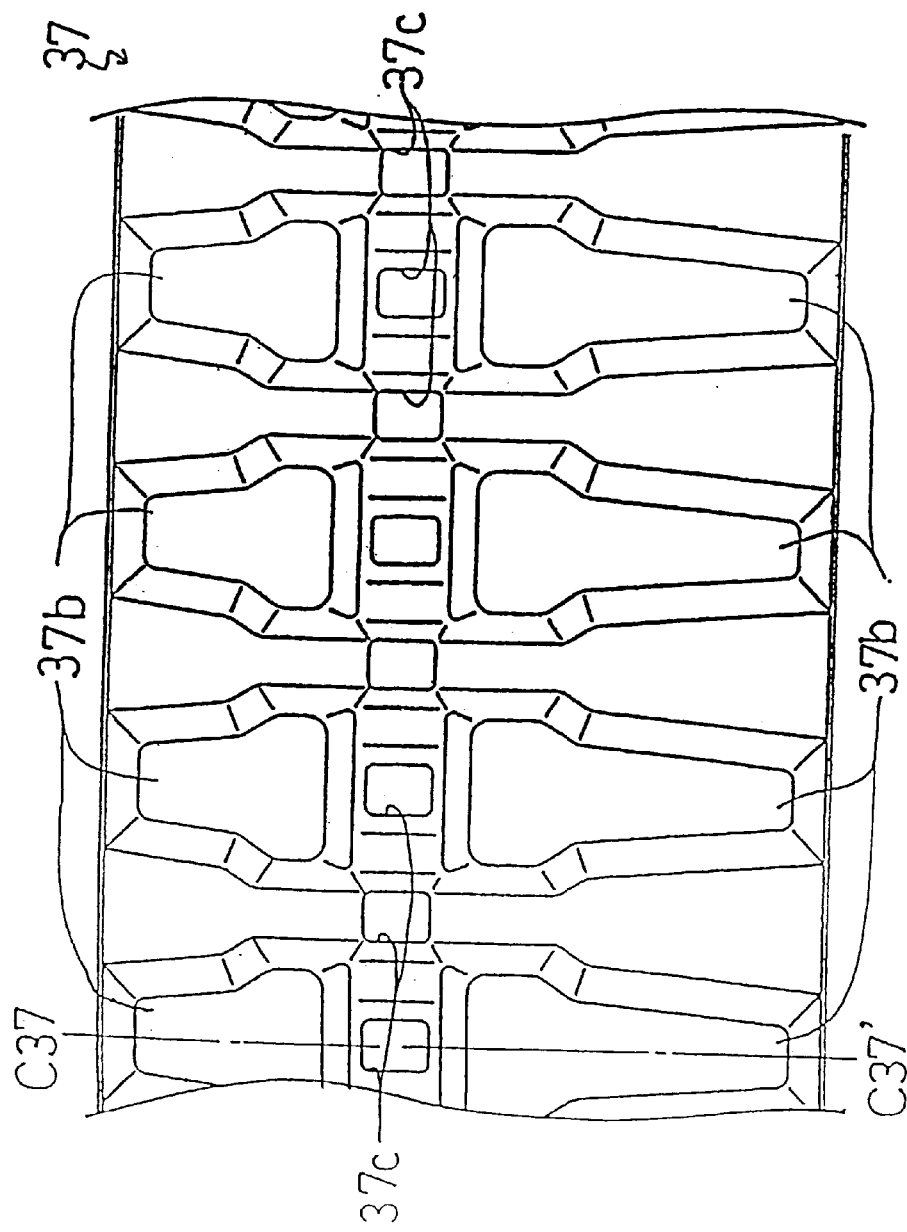
FIG. 21 is a front view of a crawler 37 showing still another embodiment about the same.
Figure 22:
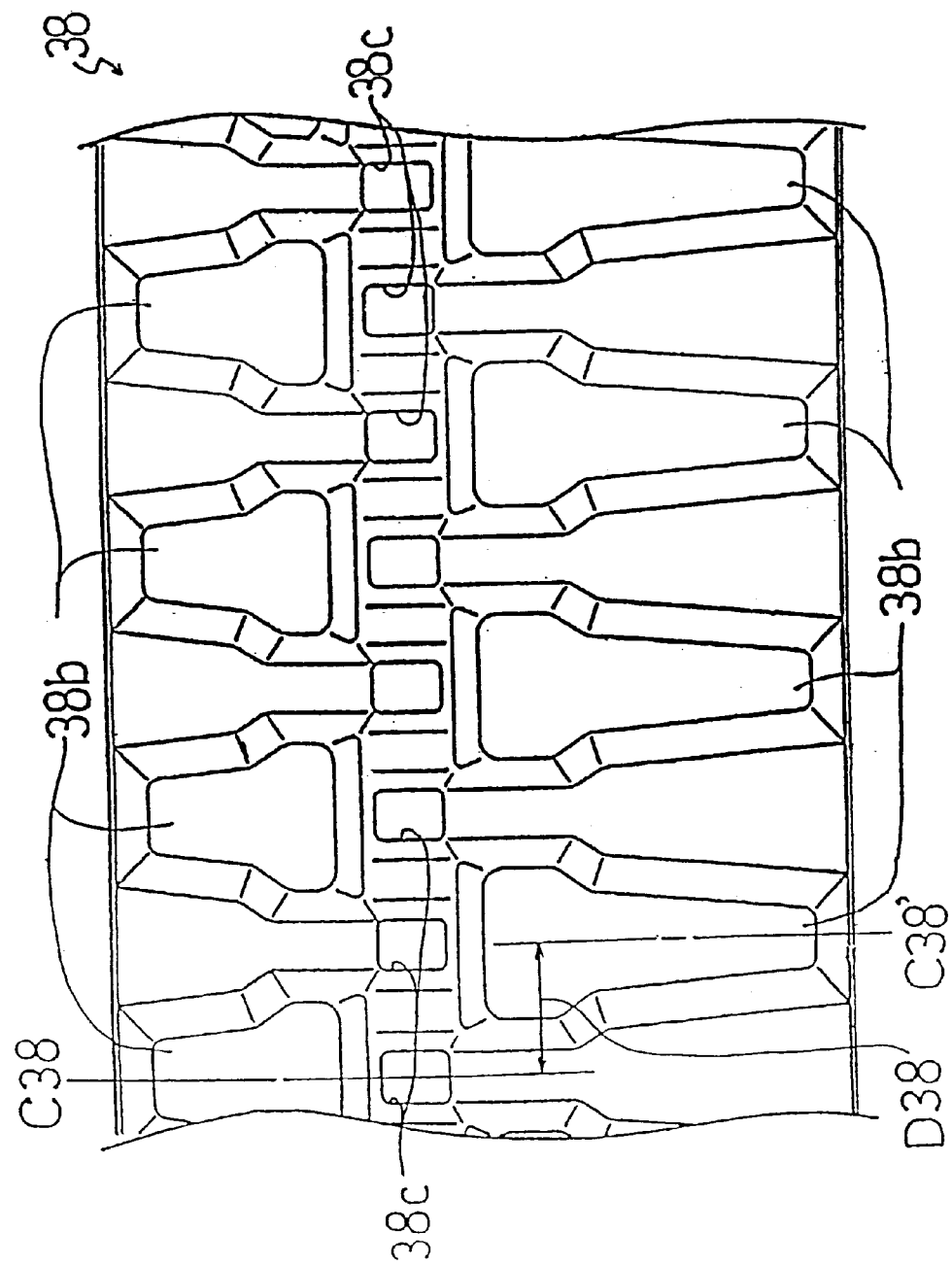
FIG. 22 is a front view of a crawler 38 showing still another embodiment about the same.
Figure 23:
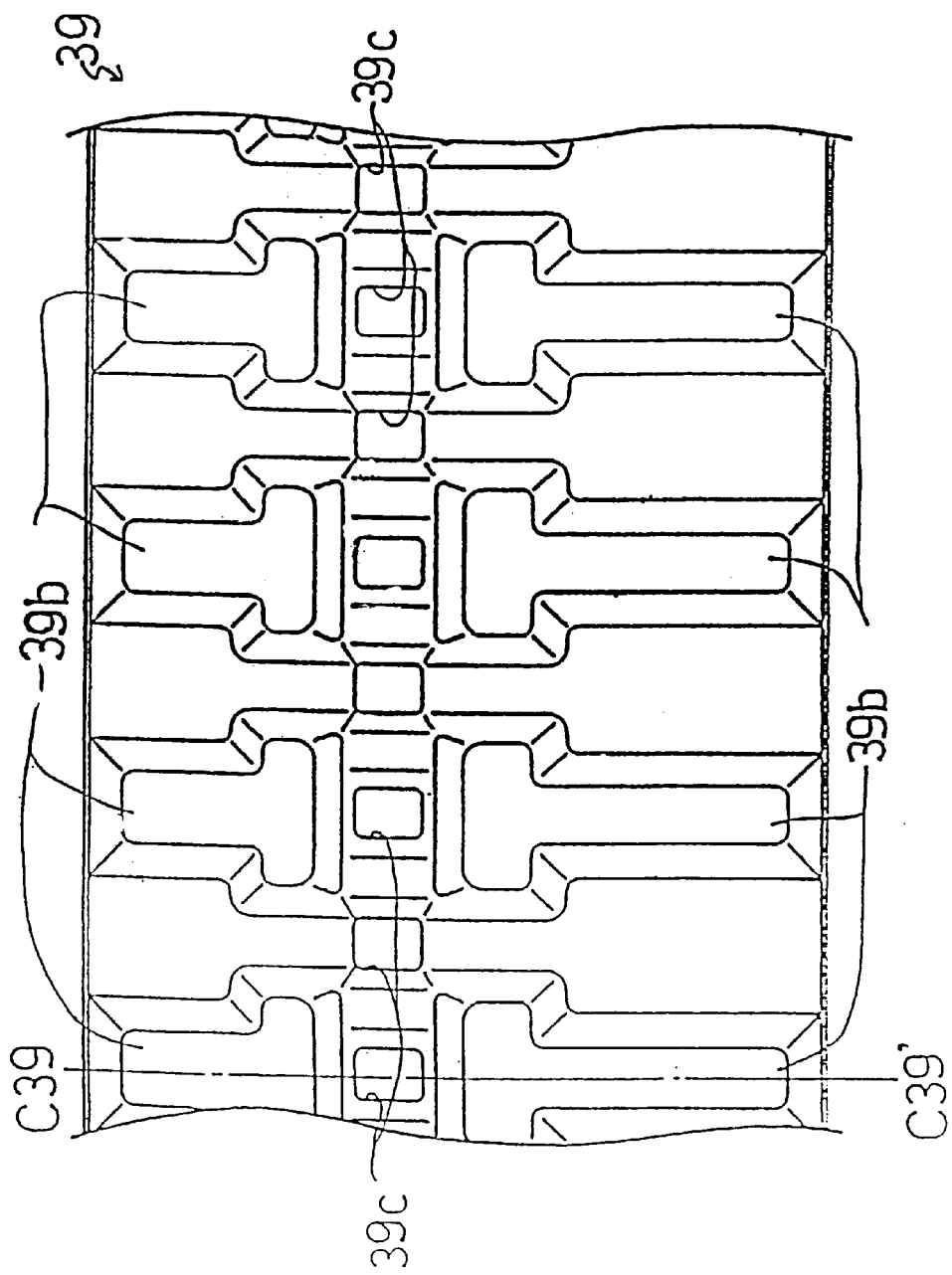
FIG. 23 is a front view of a crawler 39 showing still another embodiment about the same.
Figure 24:
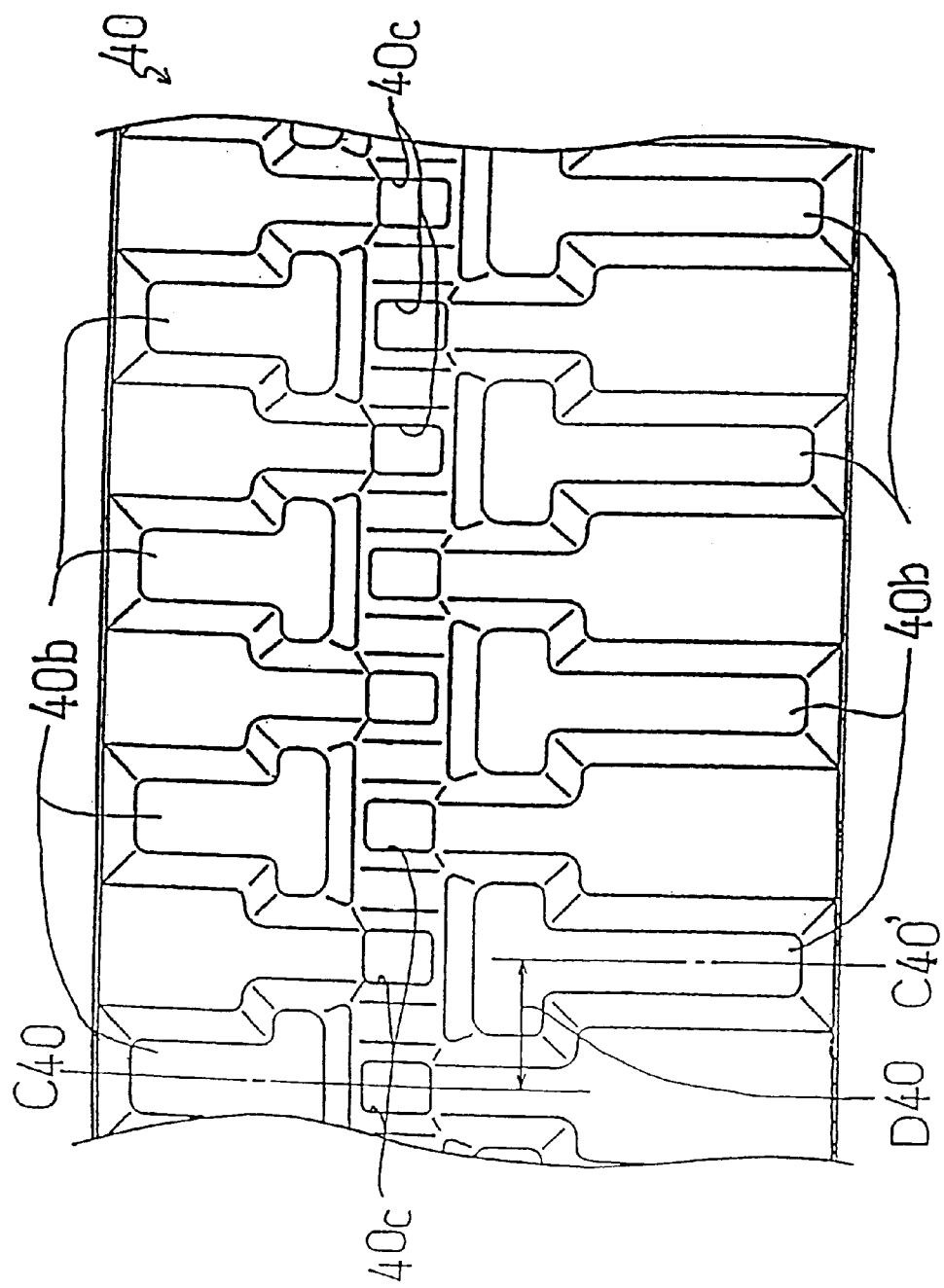
FIG. 24 is a front view of a crawler 40 showing still another embodiment about the same.

The strength of one lateral side part of each crawler 32, 34, 36, 38, 40, 42, 44, 46, 47, 48 and 49 about its core metal projections is substantially as large as that of the other lateral side part thereof. By example the crawler 32 is shown in FIG. 16 with laterally divided parts X1 and X2 that have substantially the same strength. Accordingly, the working vehicle can travel with stability.

Crawlers 34, 36, 38, 40, 42, 44, 47 and 49 are provided with respective left and right lugs 34b, 36b, 38b, 40b, 42b, 44b, 47b and 49b whose lengths in the longitudinal direction of the crawler are reduced as they approach the outer edges of the crawler. Due to this shape of the lugs, soil or other contaminants between the lugs can easily be swept toward the edges of the crawler as the vehicle travels, thereby reducing the amount of contamination carried by the rotating crawler.

However, each crawler 32, 46 and 48 with respective lugs 32b, 46b and 48b having the same longitudinal length over the whole of the lateral width thereof also provide good soil sweeping, thereby reducing the contamination carried by the respective rotating crawler.

Figure 26:
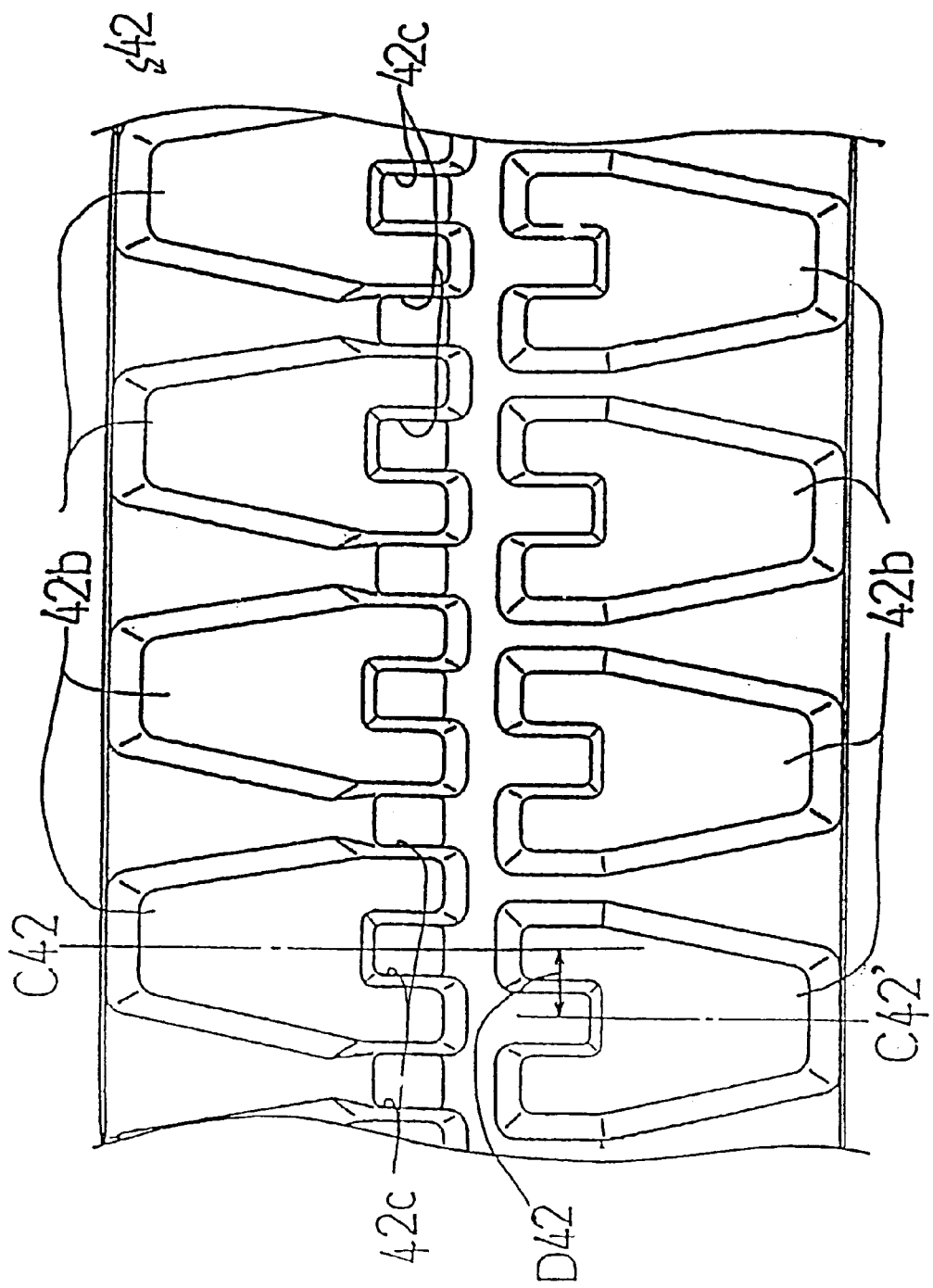
FIG. 26 is a front view of a crawler 42 showing, still another embodiment about the same.
Figure 27:
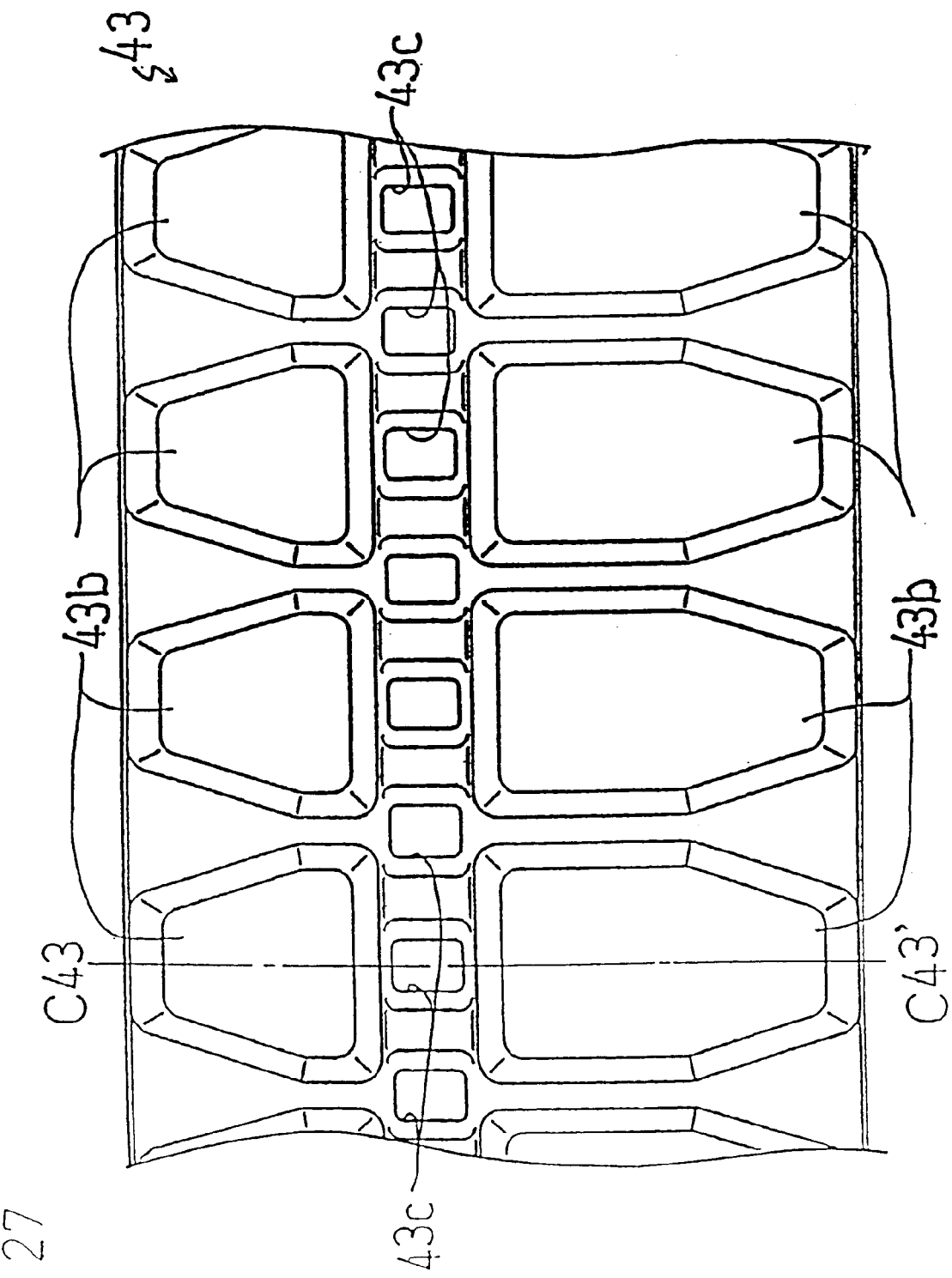
FIG. 27 is a front view of a crawler 43 showing still another embodiment about the same.
Figure 28:
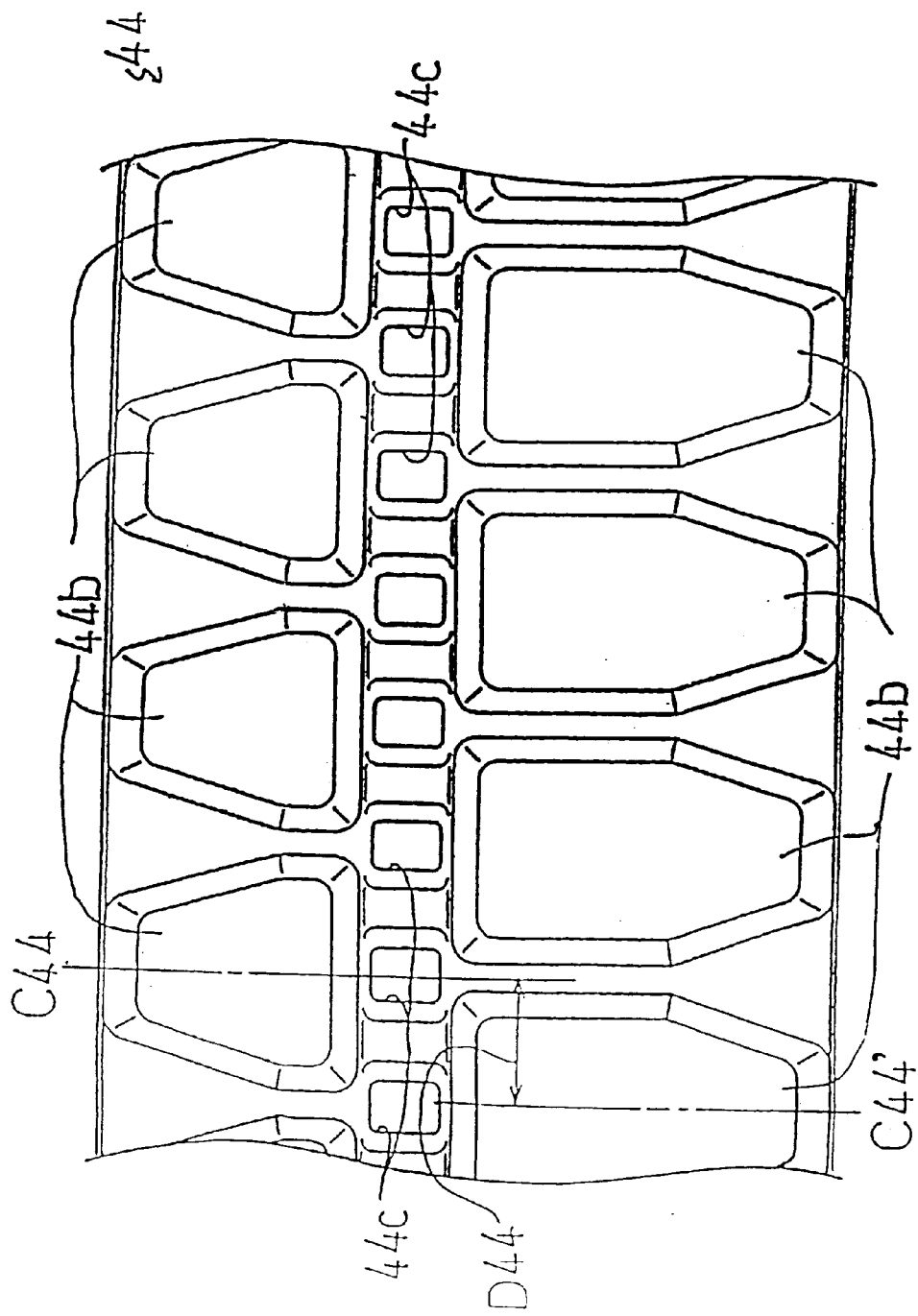
FIG. 28 is a front view of a crawler 44 showing still another embodiment about the same.
Figure 29:
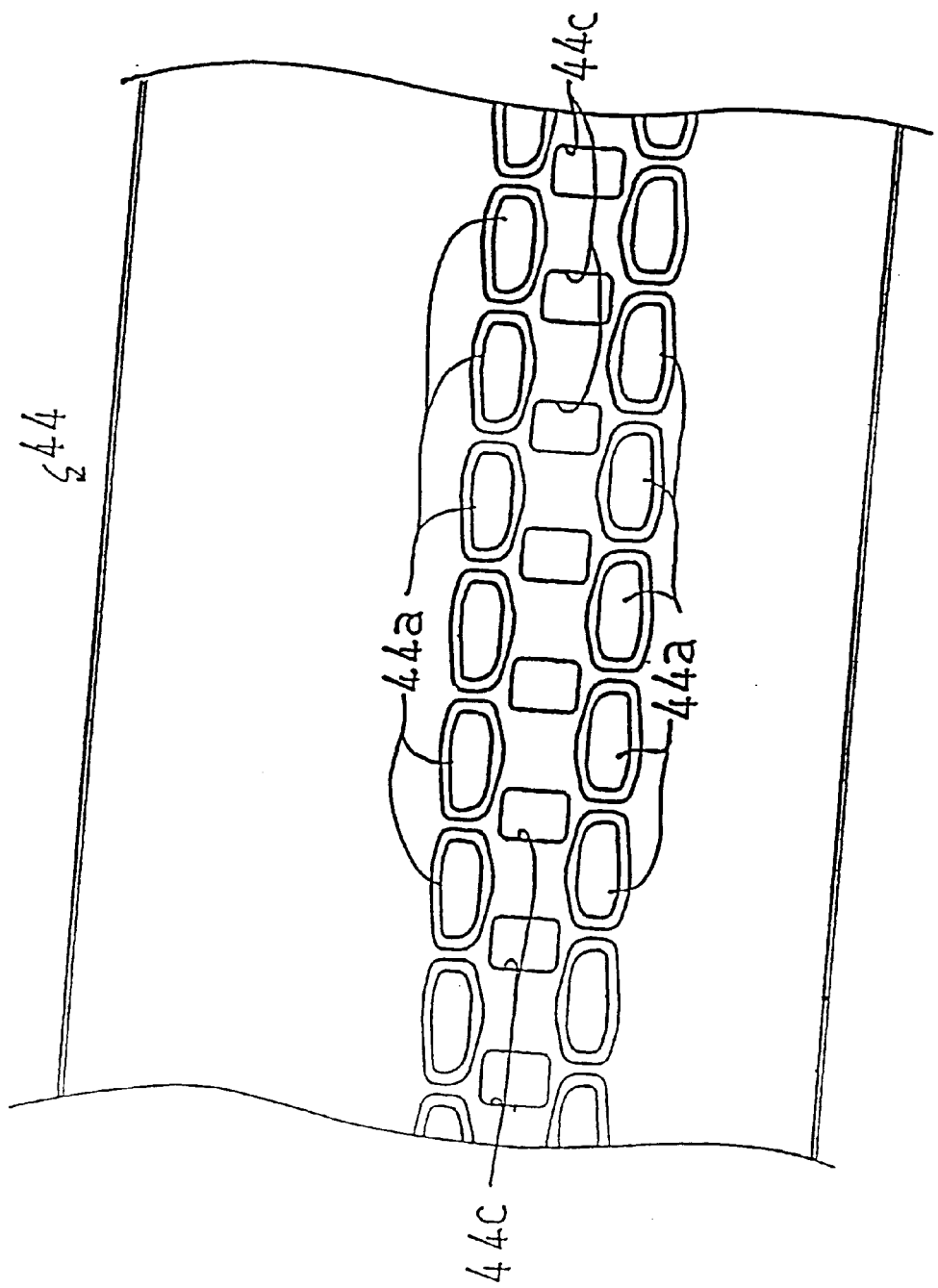
FIG. 29 is a back view of the same.
Figure 30:
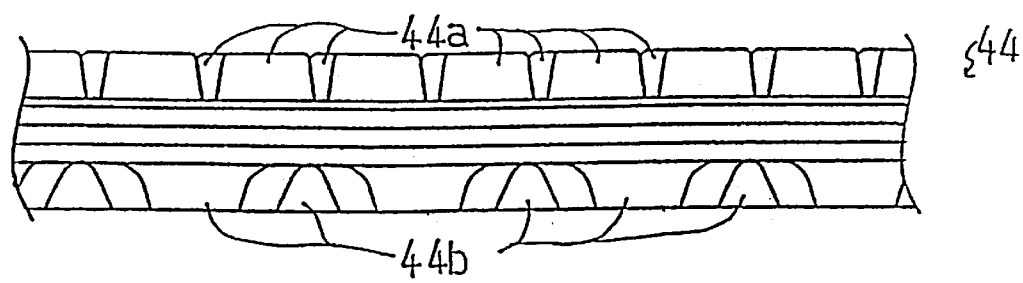
FIG. 30 is a right side view of the same.
Figure 31:
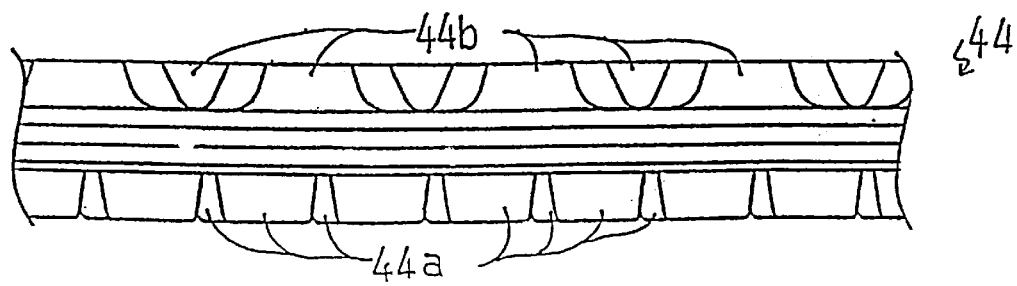
FIG. 31 is a left side view of the same.
Figure 32:
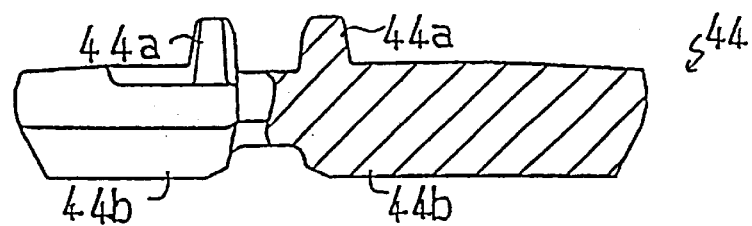
FIG. 32 is a plan view of the same.
Figure 33:
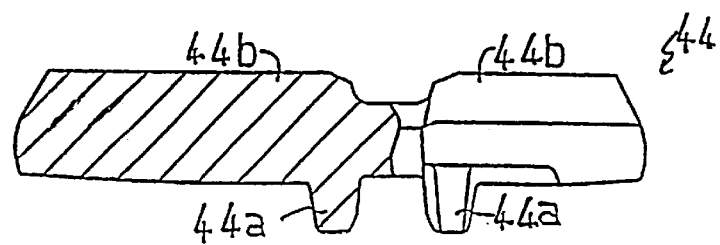
FIG. 33 is a bottom view of the same.

The area of each left lug 42b of the crawler 42 (as shown in FIG. 26) is substantially the same as each right lug 42b so as to make the adhesive area and pressure of the left and right lugs substantially identical, thereby reducing and/or preventing the inside eccentric abrasion of respective left and right lugs. Thus, the vehicle can travel with stability at all times and the endurance of the crawler 42 is prolonged.

As mentioned above, each crawler 32, 34, 36, 38, 40, 42, 44, 46, 47, 48 and 49 is provided with lugs 32b, 34b, 36b, 38b, 40b, 42b, 44b, 46b, 47b, 48b and 49b such that the lugs formed on the lateral side thereof are offset in the longitudinal direction of the crawler from the lugs formed on the medial side thereof. Thus, each of longitudinal center lines C32, C34, C36, C38, C40, C42, C44, C46, C47, C48 and C49 provided for each of the lateral side lugs 32b, 34b, 36b, 38b, 40b, 42b, 44b, 46b, 47b, 48b and 49b is offset in the longitudinal direction of the crawler from each of longitudinal center lines C32', C34', C36', C38', C40', C42', C44', C46', C47', C48' and C49' provided for each of the medial side lugs 32b, 34b, 36b, 38b, 40b, 42b, 44b, 46b, 47b, 48b and 49b with a respective length D32, D34, D36, D38, D40, D42, D44, D46, D47, D48 and D49 there between. In this construction, while the swivel working vehicle travels, one of either the left or right lugs formed on the crawler touches the ground at all times, thereby stabilizing the traveling of the vehicle.

Such constructions according to the present invention have the following effects.

Since the core metal projections of the crawler are offset toward the outside of the machine body from the lateral center position of the crawler, the distance between the core metal projections thereof serving as the balanced point of the vehicle and the center of gravity of the balance weight can be increased while the distance between the balanced point and the center of gravity of the bucket, thereby preventing the machine body from being lopsided toward the bucket or toppling even if the balance weight is lightened.

Since the steel cords for reinforcing the crawler are provided at the left side thereof about the core metal projections substantially as many as those at the right side thereof, the both left and right parts of the crawler about the core metal projections thereof can be strengthened as much as each other, thereby preventing the crawler from eccentric abrasion or eccentric loading.

In such a construction that the core metal projections of the crawler constituting the traveling device are offset toward outside from the lateral center of the crawler, since the lugs occupy substantially the same area on the left and right sides of the core metal projections, thereby equalizing the adhesive areas and the supportable load of the both side lugs, whereby the crawler can also be prevented from eccentric abrasion or eccentric loading.

Also, since the lugs are formed so as to assume laterally symmetrical shapes about the core metal projections, the same crawler can be used for both the left and right crawlers while the core metal projections are eccentrically disposed on the crawler, thereby reducing the cost. Otherwise, since the lugs of each of the crawlers disposed left and right on the machine body are formed so as to assume point symmetrical shapes about the rotational center of the swivel body, the same crawler can be used for both the left and right crawlers, thereby reducing the cost. Since the left and right crawlers can be replaced with each other in correspondence to the degree of abrasion of the lugs, the endurance of the crawler can be prolonged and the operability thereof can be improved.

Furthermore, since the left and right lugs formed on the outer peripheral surface of the crawler assume the same shapes substantially, the adhesive pressures of the left and right lugs are equalized. Accordingly, the crawler can be prevented from eccentric abrasion of its lugs, that is, the abrasion of only inner side of each of the left and right lugs, thereby enabling the vehicle to travel with a stability all the time and prolonging the endurance of the crawlers.

Still furthermore, since each lug is formed so as to assume smaller or constant length as approaching the outside thereof, soils or the like contaminated between the lugs can be swept out through the both outsides of each crawler as the vehicle travels, thereby reducing the amount of contaminations carried together with the rotating crawler.

And since crawler pieces having the core metal projections are connected front and behind with one another through connecting means provided on both side ends thereof, the crawler comprising such crawler pieces becomes a flexible integral plate corresponding to the state of being astride a stone or other obstacles on the ground laterally eccentrically positioned about the crawler while traveling, thereby improving the endurance of the crawler.

Possibility of Industrial Use

As the above, the present invention can be employed by a swivel working, for example, a hydraulic back-hoe shovel enabling small circular swivelling, whose rear end part does not project outward from its traveling device while the working mechanism, for example, a back-hoe including a bucket is swivelled at about 90° angle, so as to provide the swivel working vehicle which has advantages in the stability of working in addition to the conventional capacities of swivelling and operation because the balance weight thereof can be lightened, and provide the swivel working vehicle with low costing crawlers having good endurance.

What is claimed is:

1. A small radial swivel working vehicle, comprising:
    a pair of left and right traveling devices, each of said traveling devices including a crawler having a lateral edge and a medial edge;
    a plurality of laterally parallel core metal projections provided on each of said crawlers that are aligned in a longitudinal direction of said crawler on either side of a lateral middle line thereof;
    a swivel body horizontally rotatably mounted above a portion between said pair of traveling devices, a rotational center point of said swivel body being arranged at a substantially lateral middle portion between said pair of traveling devices;
    a balance weight provided in a portion of said swivel body having an outer surface which is circular when viewed in plan, wherein a horizontal distance between said outer surface of said swivel body and said rotational center point of said swivel body is less than a horizontal distance between said lateral edge of each of said crawlers and said rotational center point of said swivel body; and
    a working machine including a boom, a base end of said boom being pivoted on a pivot portion of said swivel body opposite to said balance weight with respect to said rotational center point, wherein a horizontal distance between said pivot portion of said swivel body and said rotational center point of said swivel body is substantially equal to a horizontal distance between said rotational center point of said swivel body and said lateral middle line of said core metal projections.

2. The small radial swivel working vehicle as set forth in claim 1, wherein said lateral middle line is offset from a longitudinal centerline of said crawler toward said lateral edge of said crawler.

3. The small radial swivel working vehicle as set forth in claim 2, further comprising:
    a plurality of steel cords for reinforcing said crawler that are longitudinally disposed in parallel to one another in each of said crawlers, wherein said steel cords are distributed in substantially equal number to the left and right of said lateral middle line of said crawler.

4. The small radial swivel working vehicle as set forth in claim 2, further comprising:
    a plurality of left lugs longitudinally aligned on said crawler, said left lugs being formed on an outer surface of said crawler to be in contact with a ground surface and disposed leftward of said lateral middle line, and
    a plurality of right lugs longitudinally aligned on said crawler, said right lugs being formed on an outer surface and of said crawler to be in contact with the ground surface and disposed rightward of said lateral middle line, wherein an area of each of said left lugs is substantially equal to an area of each of said right lugs.

5. The small radial swivel working vehicle as set forth in claim 2, further comprising:
    a plurality of left lugs longitudinally aligned on said crawler, said left lugs being formed on an outer surface of said crawler to be in contact with a ground surface and disposed leftward of said lateral middle line, and
    a plurality of right lugs longitudinally aligned on said crawler, said right lugs being formed on an outer surface of said crawler to be in contact with the ground surface and disposed rightward of said lateral middle line, wherein said left lugs and said right lugs are laterally symmetrically shaped with respect to said lateral middle line.

6. The small radial swivel working vehicle as set forth in claim 2, further comprising:
    a plurality of left lugs longitudinally aligned on said crawler, said left lugs being formed on an outer surface of said crawler to be in contact with a ground surface and disposed leftward of said lateral middle line, and
    a plurality of right lugs longitudinally aligned on said crawler, said right lugs being formed on an outer surface of said crawler to be in contact with the ground surface and disposed rightward of said lateral middle line, wherein each of said left lugs and each of said right lugs are shaped identically with each other.

7. The small radial swivel working vehicle as set forth in claim 2, further comprising:
    a plurality of lugs formed on an outer surface of said crawler to be in contact with a ground surface, wherein said lugs form a common crawler that is longitudinally reverseable so that it is interchangeable on both of said left and right traveling devices and wherein said lugs disposed on said left and right traveling devices are symmetrically shaped with respect to said rotational center point of said swivel body when viewed in plan.

8. The small radial swivel working vehicle as set forth in claim 2, further comprising:
    a plurality of lugs formed on an outer surface of said crawler to be in contact with a ground surface, each of said lugs being extended toward either said lateral or medial edge of said crawler from said lateral middle line of said crawler, wherein a shape of each of said lugs narrows or remains constant as the shape extends toward either of said lateral or medial edges of said crawler.

* * * * *